United States Patent [19]

Ogino et al.

[11] Patent Number: 5,404,128
[45] Date of Patent: Apr. 4, 1995

[54] PRESENCE DETECTING AND SAFETY CONTROL APPARATUS

[75] Inventors: Hiroyuki Ogino, Nara; Yoshiaki Watanabe, Yamatokoriyama; Fumikazu Shiba, Nara; Masayoshi Miki, Nara; Shunichi Nagamoto, Nara, all of Japan

[73] Assignee: Matsushita Electric Industrial Co., Ltd., Osaka, Japan

[21] Appl. No.: 30,531

[22] Filed: Mar. 12, 1993

[30] Foreign Application Priority Data

Mar. 13, 1992 [JP] Japan .................................. 4-054847

[51] Int. Cl.⁶ .............................................. G08B 21/00
[52] U.S. Cl. .................................. 340/425.5; 340/439; 340/568; 340/576; 340/667; 180/273
[58] Field of Search ............... 340/576, 573, 575, 439, 340/425.5, 568, 540, 667; 180/273, 272, 270, 268

[56] References Cited

U.S. PATENT DOCUMENTS

| 2,902,030 | 9/1959 | Kennedy et al. | 340/375 |
| 3,859,485 | 1/1975 | Blinkilde et al. | 200/85 A |
| 3,860,904 | 1/1975 | Anderson | 340/667 |
| 4,031,527 | 6/1977 | Yanagishima et al. | 340/576 |
| 4,569,536 | 2/1986 | Tsuge et al. | 180/268 |
| 4,796,013 | 1/1989 | Yasuda et al. | 340/562 |
| 4,856,612 | 8/1989 | Clevenger, Jr. et al. | 180/273 |
| 5,164,709 | 11/1992 | Lamberty et al. | 280/732 |
| 5,232,243 | 8/1993 | Blackburn et al. | 340/667 |

FOREIGN PATENT DOCUMENTS

| 3049275 | 7/1982 | Germany . |
| 3248179 | 6/1984 | Germany . |
| 3842261 | 6/1990 | Germany . |
| 1-079857 | 3/1989 | Japan . |
| 2150725 | 7/1985 | United Kingdom . |
| 2192460 | 1/1988 | United Kingdom . |
| 2201820 | 9/1988 | United Kingdom . |

Primary Examiner—Glen Swann
Attorney, Agent, or Firm—Wenderoth, Lind & Ponack

[57] ABSTRACT

A safety control apparatus positively discriminates between an object and a person through the detection of subtle physical movement corresponding to the heart activity and the breathing unique to the life activity of the human body from a output signal of a vibration sensor disposed on a seat so as to accurately decide whether or not a person is present. The maintenance of the safe operation of the moving vehicle can be realized. The starting of the moving vehicle is inhibited if the reserved seat is determined to be unoccupied in accordance with the decision result. In the case where the person is present, the moving of the vehicle is not started before the engagement of the seat belt has been detected.

20 Claims, 34 Drawing Sheets

PRESENCE DETECTING AND SAFETY CONTROL APPARATUS

BACKGROUND OF THE INVENTION

The present invention generally relates to a safety control apparatus which is adapted to detect the presence or absence of passengers on the seats in a moving vehicle such as an automobile, train, passenger plane or the like, the physiological mental state such as arousal level, tension degree or the like of the passenger so as to control the driving operation of the above described moving vehicle for maintaining the safe operation of the above described moving vehicle.

If the presence of the passengers can be detected, the empty seats of trains, passenger planes, buses and so on can be investigated and the unfastened condition of seat belts can be determined. The solar heat accidents with respect to infants left behind within the compartment in the summer time can be prevented from occurring. The safe operation can be effected if the physiological mental state such as arousal level, tension degree or the like of the passengers can be detected. For example, dozing while driving can be prevented, or the vehicle can be stopped by the detection of an abnormal physical or mental condition during the driving of the vehicle.

The conventional presence (hereinafter referred to as passenger present) detecting means in this type of safety control apparatus is shown hereinafter. In, for example, the U.S. Pat. No. 3,859,485, the presence detecting means is a seat switch with a pressure sensitive conductive material 1 being disposed between electrodes 2 and 3 as shown in FIG. 1 and FIG. 2. FIG. 2 is a sectional view taken along a line I—I of FIG. 1. When the human body sits on the seat switch, the pressure due to the physical weight is applied to the pressure sensitive conductive material 1, and the resistance value of the pressure sensitive conductive material 1 is lowered. In the construction, the electrodes 2 and 3 become conductive so as to detect the presence of the human body. There is a problem in that the resistance value of the pressure sensitive conductive material 1 is lowered by the weight of an object even when an object is placed upon the seat switch so that the electrodes 2 and 3 become conductive so as to effect the mistaken detection. The same problem is seen even in the presence detecting apparatus of, for example, G.B. Pat. No. 2,201,820.

In, for example, U.S. Pat. No. 4,796,013, an electrode 4 is set in the indoor roof, and an electrode 5 is set on the seat as shown in FIG. 3. A change in the electrostatic capacity of the capacitor formed by the electrodes 4 and 5 is detected so 10 as to detect the presence. In such a construction, mistaken detections are effected, because the electrostatic capacity of the above described capacitor is changed if a person sitting on the next seat swings his arm over the seat with the electrode 5 contained within.

In the conventional safety control apparatus, a passenger can not be accurately detected, with a problem in that errors are caused.

SUMMARY OF THE INVENTION

Accordingly, the present invention has been developed with a view to substantially eliminating the above discussed drawbacks inherent in the prior art and has for a first object to provide an improved safety control apparatus for positively detecting the seating of a person by the difference between a person and an object on the seat so as to maintain the safe operation of the vehicle.

A second object of the present invention is to provide an improved safety control apparatus which is adapted to detect the physiological mental state such as arousal level, tension degree or the like of the passenger so as to maintain the safe operation of the moving vehicle.

In order to achieve the above described first object, the safety control apparatus of the present invention comprises a support member for receiving and supporting a human body placed thereon; a driving means for moving the support member with a power source; a vibration sensor disposed in one position of a seat placed on the support member; a physical movement characteristic detecting means for detecting the physical movement characteristics in accordance with the life activity of the human body by the signal from the vibration sensor; a presence deciding means for judging whether or not the human body is present on the seat in accordance with a physical movement signal from the physical movement characteristic detecting means, and a control means for controlling the driving of the driving means in accordance with a presence signal from the presence deciding means. Subtle physical movements corresponding to the activity of the heart and the breathing peculiar to the life activity of the human body from the output signal of the vibration sensor are detected so as to positively discriminate between an object and a person for effecting the precise judgment of the presence of a person. The safe operation of the moving vehicle is maintained by inhibiting the starting of the moving vehicle if the person is determined to be absent in accordance with the decision results.

In order to prevent, for example, a train, a passenger plane, a bus and so on from being delayed, the present invention is provided with a seat reserving means for making reservations of the seats in the moving vehicle. The control means compares a seat reserving signal inputted from the seat reserving means with a presence signal inputted from the presence deciding means so as to maintain the safe operation of the moving vehicle by inhibiting the starting of the moving vehicle when the reserved seat is unoccupied.

The present invention is provided with a seat belt detecting means for detecting the engagement of the seat belt and a warning issuing means. When the seat belt is not engaged in spite of the presence of a passenger being detected, a warning is issued so as to inhibit the starting of the driving of the moving vehicle.

The present invention detects the subtle physical movements corresponding to the heart activity and the breathing peculiar to the life activity of the human body. The vibration sensor is composed of a piezo-electric material, electrodes provided on two faces of the above described piezo-electric material, a connecting terminal being connected to each electrode so as to output the output signal of the electrodes.

The present invention effects an impedance conversion of the output signals from the piezo-electric material in an impedance conversion circuit connected to the connecting terminals.

The vibration sensor is provided with a shield so that the vibration sensor itself is shielded from the influence of noise.

In order to detect abnormalities such as disconnection, shorts and so on of the vibration sensor, the vibration sensor is composed of a piezo-electric material, an electrode provided on two faces of the piezo-electric material, a connecting terminal connected to each of the electrodes so as to output the output signal of the electrodes, and a first resistor connected between the electrodes. The abnormality of the vibration sensor can be detected in accordance with the voltage value divided by a second resistor connected to one of the electrodes and the first resistor.

The present invention can judge the abnormality of the vibration sensor by the detection of the resistance value between the connecting terminals. The vibration sensor is provided with a piezo-electric material, electrodes provided on two faces of the piezo electric material, and a connecting terminal provided on each of the ends of the electrodes.

In order to detect the abnormality of the vibration sensor, the present invention can detect the abnormality of the above described vibration sensor in accordance with the output signal of the physical movement characteristic detecting means at this time by the vibrations being applied upon the vibration sensor by the vibration applying means.

The present invention can detect the abnormality of the above described physical movement characteristic detecting means in accordance with the output signal of the physical movement characteristic detecting means with the predetermined reference signal being inputted to the physical movement characteristic detecting means.

The present invention detects the subtle physical movements of heart activity and the breathing peculiar to the life activity of the human body to the physical movement characteristic detecting means which is composed of a filter for filtering only a specific frequency component of the output signal of the vibration sensor, an amplifier for amplifying the output signal of the filter, and a smoothing means for smoothing the output signals of the amplifier.

The presence detecting means is provided with a timer which is operated if the physical movement signal inputted from the physical movement characteristic detecting means is at least a predetermined set value, and a deciding means which determines that a passenger is present if a clocking signal inputted from the timer is present for at least a certain time period and determines that the passenger is absent if the clocking signal is not present for the certain time period.

The presence deciding means of the present invention is composed of a first deciding means and a second deciding means. The first deciding means determines that the passenger is present if the physical movement signal inputted from the physical movement characteristic detecting means is at least a predetermined first set value and determines that the passenger is absent if it is not so. The second deciding means retains the absence determination before the physical movement signal reaches at least a predetermined second set value if the absence determination is effected by the first deciding means and determines whether or not the passenger is present in accordance with the first deciding means when the physical movement signal reaches at least the second set value.

In order to raise the accuracy of the presence decision, the present invention is provided with a running speed detecting means for detecting the running speed of the vehicle. The presence deciding means calculates the set value for the presence decision in accordance with the running speed signal inputted from the running speed detecting means, and compares the physical signal to be inputted from the physical movement characteristic detecting means with the set value so as to determine the presence or absence of the passenger.

The physical movement characteristic detecting means of the present invention is provided with a plurality of filters for filtering a specific frequency component of the respective output signals of the vibration sensor in accordance with the fact that the respective resonant frequencies are different between persons and things. The presence deciding means determines whether the passenger is present in accordance with the plurality of output signals of the plurality of filters.

In order to achieve the above described second object, the safety control apparatus of the present invention has a physiological mental state deciding means for judging the physiological mental state such as arousal level, mental, physical tension degree and so on of the passenger in accordance with the physical movement signal inputted from the physical movement characteristic detecting means. The control means has a timer to which the presence signal is inputted from the presence deciding means; the control means is operated if the physiological mental state deciding signal inputted from the physiological mental state deciding means is no greater than a predetermined set value, a driving control means for stopping the driving of the driving means if the clock signal of the timer is at least a predetermined set time, and a warning generating means for generating a warning by the operation of the timer.

The physiological mental state deciding means is provided with a timer which is operated if a physical movement signal inputted from the physical movement characteristic detecting means is at least a predetermined set value, an arousal level deciding means for determining the arousal level of the person present in accordance with the clock signal inputted from the timer.

The physiological mental condition deciding means is provided with a heart pulse detecting means for detecting the heart pulses of the present person in accordance with the physical movement signal inputted from the physical movement characteristic detecting means, and an arousal level deciding means for determining the arousal level in accordance with the heart pulse signal to be inputted from the heart pulse detecting means.

The physiological mental state deciding means of the present invention is provided with a computing means for effecting a frequency analysis of the physical movement signals inputted from the physical movement characteristic detecting means, and a tension degree deciding means for determining the mental and physical tension degree of the present person in accordance with the frequency analysis signal inputted from the calculating means.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
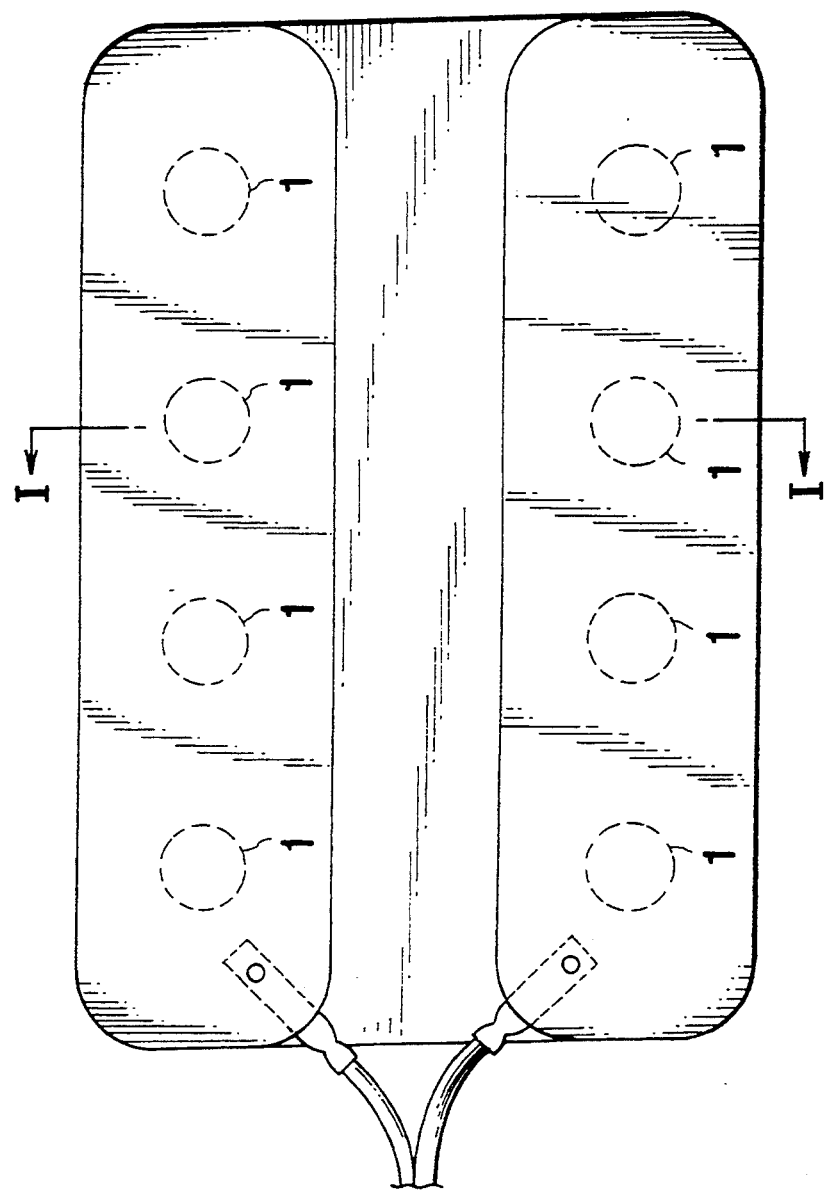
FIG. 1 is an outer appearance view of the conventional presence detecting means.
Figure 2:
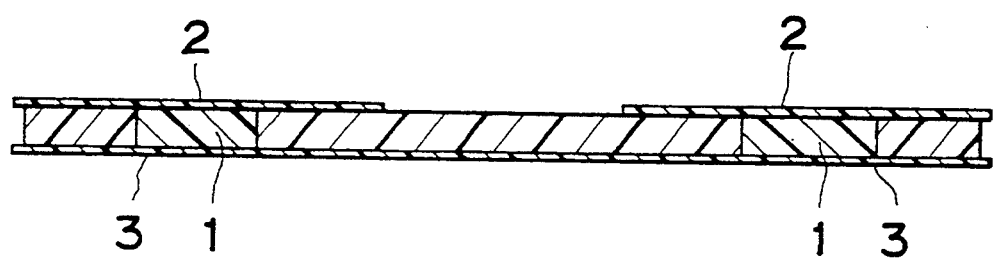
FIG. 2 is a sectional view taken along a line I—I of FIG. 1.
Figure 3:
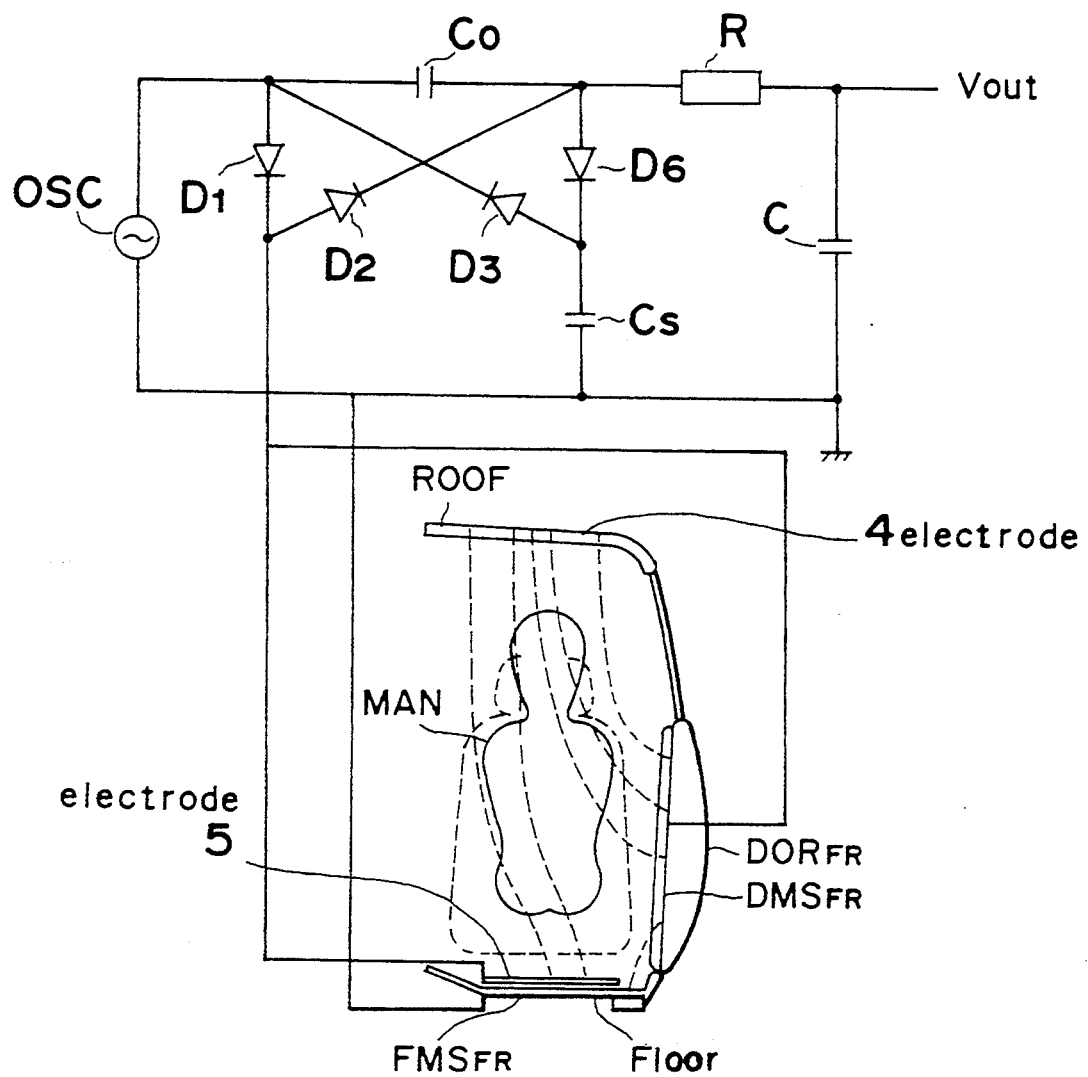
FIG. 3 is a block diagram of the conventional presence detecting means.

Before the description of the present invention proceeds, it is to be noted that like parts are designated by like reference numerals throughout the accompanying drawings.

A first embodiment of the present invention is described below.

Figure 4:
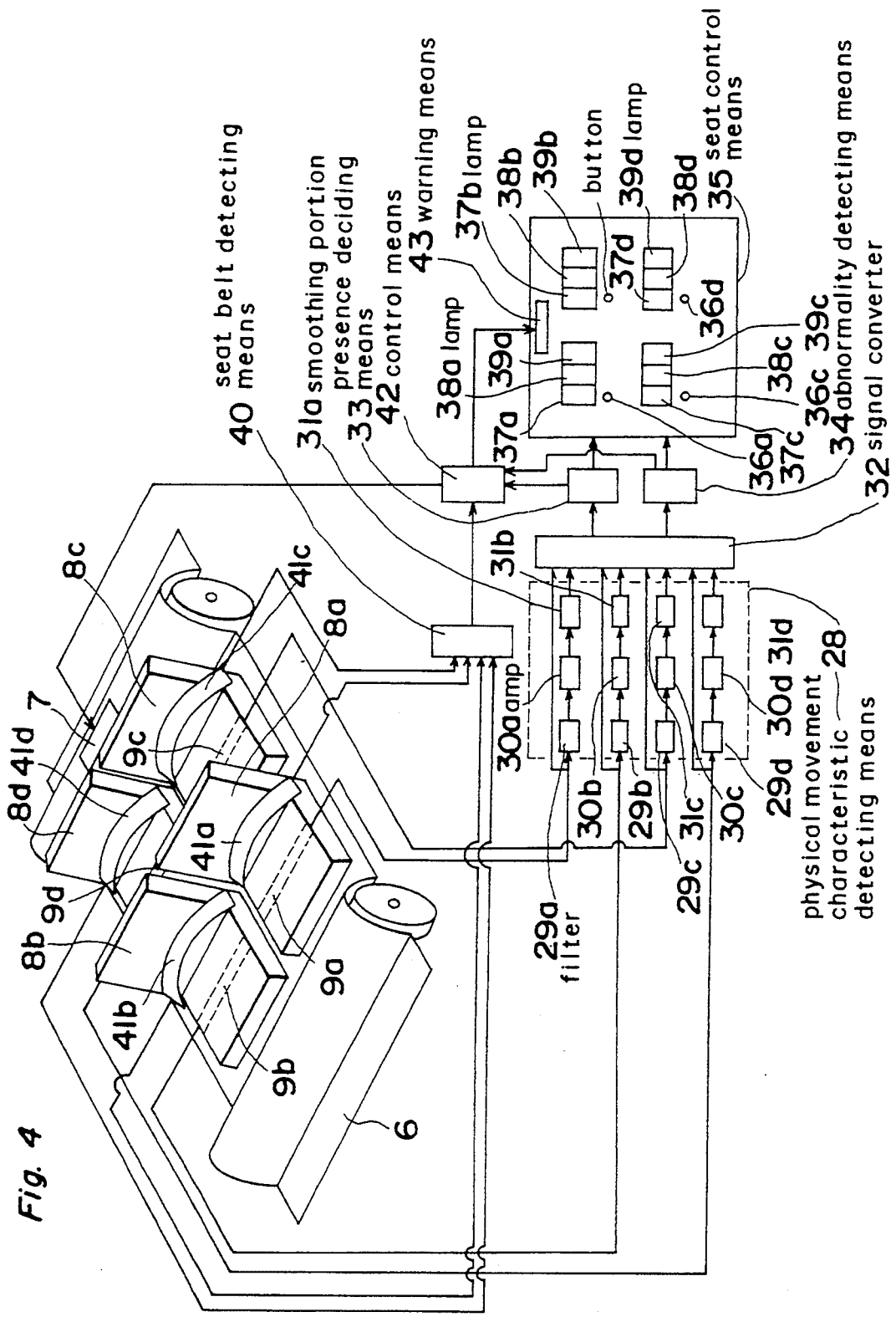
FIG. 4 is a block diagram of a safety control apparatus in accordance with in a first embodiment of the present invention.
Figure 5:
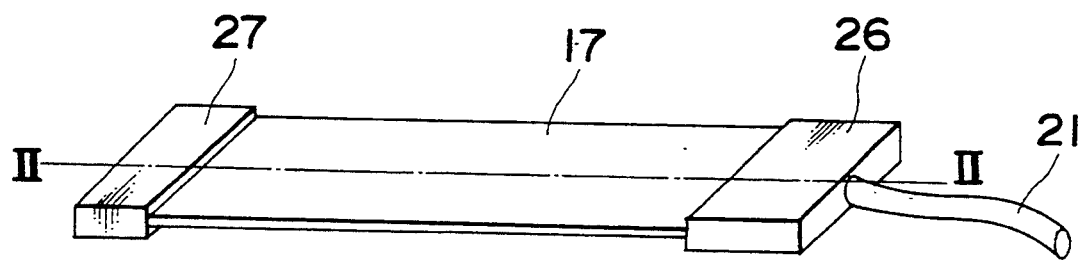
FIG. 5 is a perspective view of a vibration sensor of the same apparatus.
Figure 6:
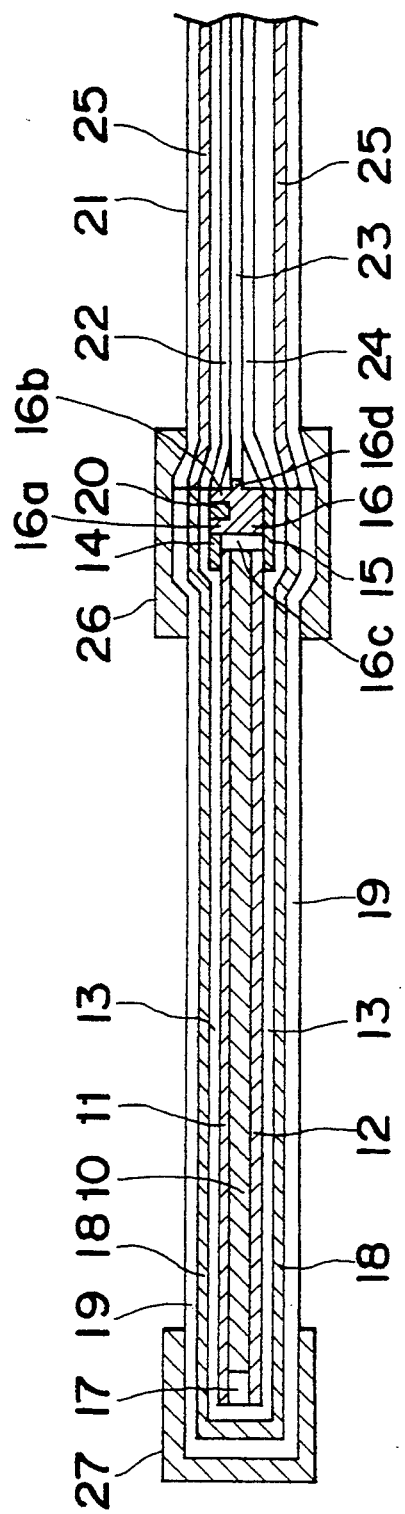
FIG. 6 is a sectional view of a vibration sensor of the same apparatus.
Figure 7:
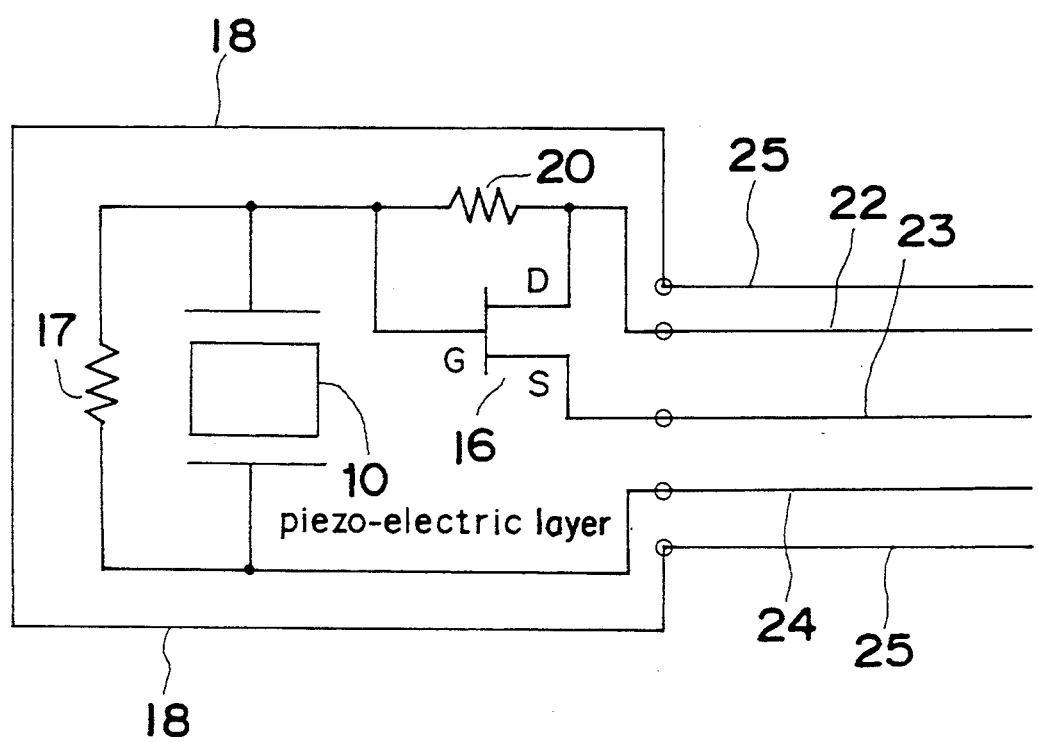
FIG. 7 is an equivalent circuit diagram showing the connection between the vibration sensor and a shield cable of the apparatus.

FIG. 4 is a block diagram of an apparatus in accordance with a first embodiment of the safety control apparatus of the present invention. Reference numeral 6 denotes a support member for having a human body placed so as to support. Reference numeral 7 denotes a driving means for moving the supporting member 6 with a power source. A plurality of seats 8a through 8d are set on the support member 6. Vibration sensors 9a through 9d are disposed in the respective seats. These vibration sensors are the same in construction. FIG. 5 is a perspective view of these vibration sensors. FIG. 6 is a sectional view taken along a line of II—II of FIG. 5. The vibration sensor has flexible electrodes 11 and 12 disposed on both faces of a piezo-electric layer 10 with a macro-molecule piezo-electric thin film material of vinylden polyfluoride (PVDF) or the like. The vibration sensor molded as a thin film includes an insulation layer of a polyester film 13. The respective electrodes are respectively connected to connecting terminals 14 and 15. The connecting terminal 14 is connected to a gate terminal 16a of the impedance converter 16 using, for example, an FET. A first resistor 17 for disconnection detecting use is connected to electrodes 11 and 12. A shield layer 18 for reducing the electric noise of a strong electric field is provided on the polyester film 13 and a polyester insulation layer 19 is further provided on it. A second resistor 20 is connected between the gate terminal 16a of the impedance converter 16 and the drain terminal 16b. Reference numeral 16c denotes an insulation gap. The drain terminal 16b, the source terminal 16d, the connecting terminal 15 and the shield layer 18 are connected in this order with the respective conductors 22, 23, and 24 and a shield layer 25 of a shielded cable 21 of a three wire system. Molded portions 26 and 27 of a resin, for reinforcement against impact, are provided respectively on one end where the connecting terminals 14 and 15, the impedance converter 16 and the second resistor 20 are disposed, and on another end where the first resistor 17 is disposed. FIG. 7 shows an equivalent circuit diagram showing the connection between the vibration sensor 8a and the shield cable 21. Circles in the drawing are connection points of both signal wires of the vibration sensor 8a and the shielded cable 21 within the molded portion 26. The vibration sensors 9a through 9d are respectively disposed under the surface coverings of the seats 8a through 8d. Reference numeral 28 denotes a physical movement characteristic detecting means for detecting the physical movement characteristics in accordance with the life activity of the human body, which is provided with: filters 29a through 29d for filtering a certain specific frequency component of the respective signals inputted from the vibration sensors 9a through 9d, amplification portions 30a through 30d for amplifying the filtered signals, and smoothing portions 31a through 31d for smoothing the input signals. Reference numeral 32 denotes a signal converter, which effects an A/D conversion of voltage dividing signals between the first resistor 17 built in the vibration sensors 9a through 9d and a second resistor 20 corresponding to it, and signals inputted from the smoothing portions 31a through 31d. Reference numeral 33 denotes a presence deciding means for judging whether or not a human body is present in the seats 9a through 9d in accordance with a signal inputted from the signal converter 32. Reference numeral 34 denotes an abnormality detecting means for detecting the abnormalities of disconnections and shorts of the vibration sensors 9a through 9d and the shielded cable 21 from the A/D conversion value of the above described voltage dividing signal. Reference numeral 35 denotes a seat control means for effecting the seat reservation, the control of the persons present and the display of something wrong with the apparatuses. Seats 8a through 8d are reserved by the depression of the reservation buttons 36a through 36d respectively corresponding thereto so as to light the corresponding reserved lamps 37a though 37d. Elements 38a through 38d are display lamps for displaying the decision results determined by the presence deciding means 33. The respective presence decision results of the seats 8a through 8d correspond to the light on condition of the display lamps 38a though 38d. Similarly, elements 39a through 39d are display lamps showing the existence of the abnormalities detected by the abnormality detecting means 34. Reference numeral 40 denotes a seat belt detecting means for detecting the engagement of the seat belts 41a through 41d. Reference numeral 42 denotes a control means for controlling the driving condition of a warning means 43 and a driving means 7 in accordance with the presence signal from the presence deciding means 33. The physical movement characteristic detecting means 28, the signal converting means 32, the presence deciding means 33, the abnormality detecting means 34, the seat belt detecting means 40, the control means 42 and so on are contained within an electrically shielded box (not shown in drawing).

Figure 8:
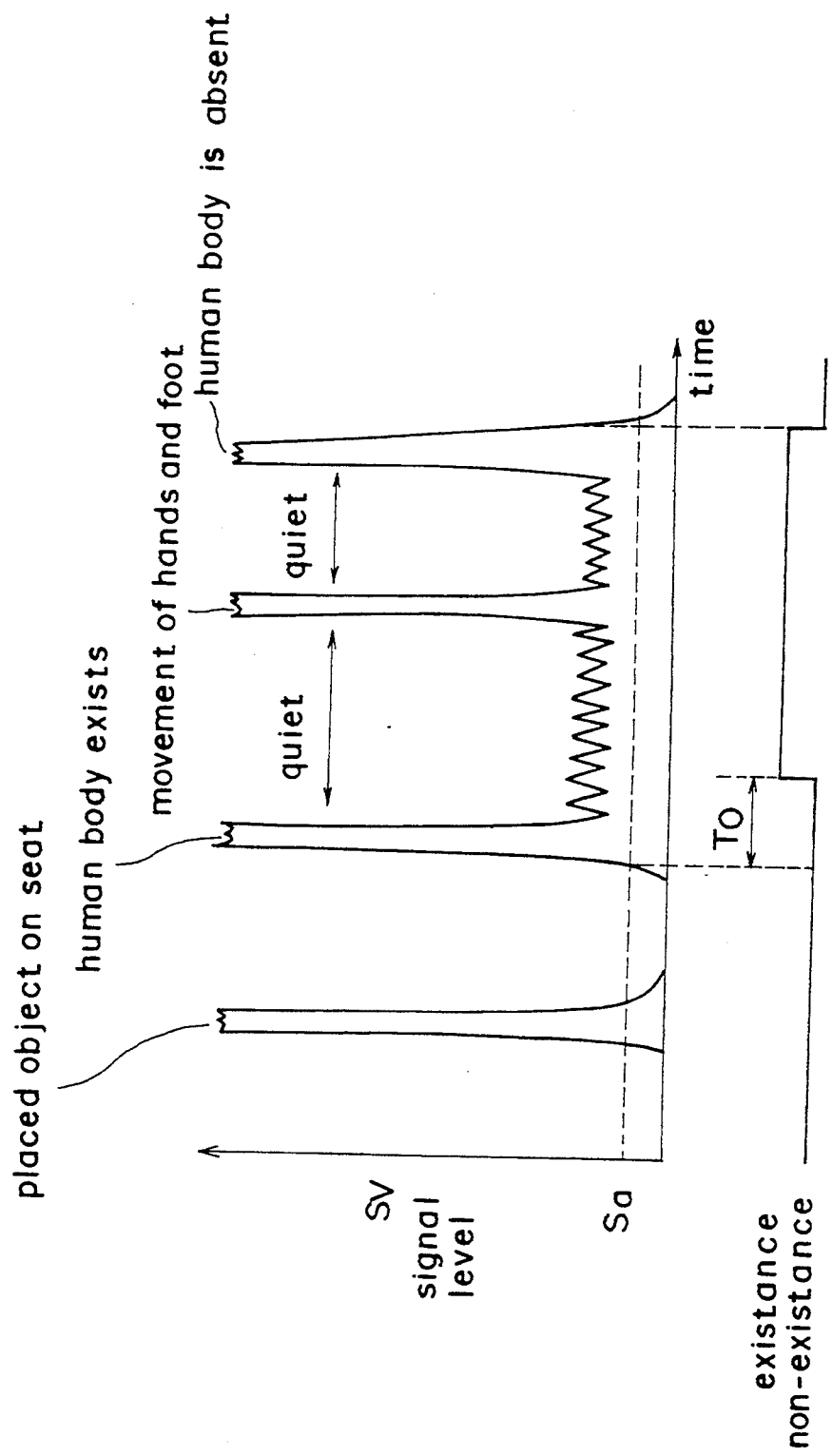
FIG. 8 are output waveforms from the smoothing portion of the same apparatus.
Figure 9:
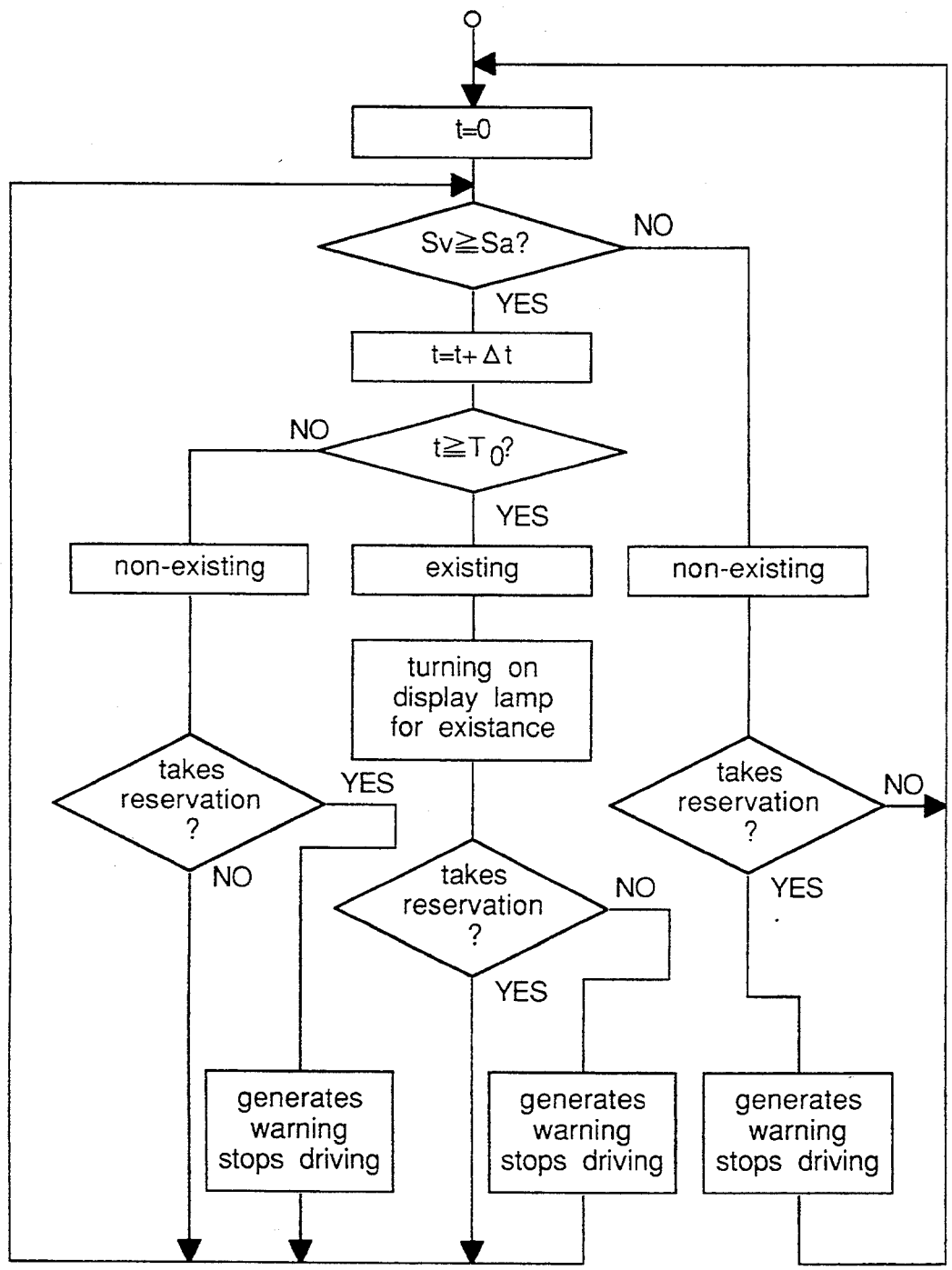
FIG. 9 through FIG. 11 are flowcharts showing the control of the same apparatus.

The presence decision will be described with respect to the seat 8a. When a human body sits on the seat 8a, the piezo-electric layer 10 is deformed so as to generate a voltage through the piezo-electric effect so that the generated voltage is across the electrodes 11 and 12. When the generated voltage is inputted into the physical movement characteristic detecting means 28, the filter 29a lets only the signal component of approximately 10 Hz from approximately 1 Hz out of the input signal so as to output the physical movement signal by, for example, the heart pulse activity as the physical movement characteristics in accordance with the life activity of the human body. The amplification portion 30a amplifies the signal and the smoothing portion 31a smooths the signals thereby filtered. FIG. 8 shows the time variation of a signal level Sv after the smoothing operation. As shown, a larger signal temporarily appears because of the impact of the sitting operation, and the subtle physical movement signals appear because of the activity of the heart of the human body when the human body is quiet. When no human body exists on the seat, the output signal becomes zero. Although a larger signal temporarily appears as soon as an object is placed on the seat when an object has been placed on the seat, the output signal becomes zero, because the object has no physical movements by the heart activity and breathing activity as shown in the human body. The presence decision means 33 determines in accordance with the output signal that the human body is present only when the physical movement signal by the heart activity of the human body has appeared. Namely, as shown in FIG. 8, the signal level Sv becomes Sa or more in the drawing as the physical movement signals exist because of the activity of the heart when the human body exists. When the human body is absent, the signal level Sv becomes zero. When an object is placed on the seat, the output of Sa or more is temporarily caused, and thereafter the signal level becomes zero. The presence deciding means determines that the human body is present if the condition of the $Sv \geq Sa$ continues for a certain constant time period To or more. The presence deciding means determines that no human body exists except for the above described case. The decision results from the presence deciding means 33 shows for each of the respective seats on the display lamps 38a through 38d of the seat control means 35. When the seat is reserved in advance, the reservation finished lamps 37a though 37d are lit on if the reservation buttons 36a through 36d are depressed so as to reserve the seats. When a determination has been made in accordance with the presence signal from the presence deciding means 33 that a reserved seat is not present (or unoccupied) and an unreserved seat is present (or occupied), the control means 42 operates a warning means 43 so as to generate an warning and stop the driving of the driving means 7. A flowchart showing the above described procedure is shown in FIG. 9.

Conventionally there was a problem by the above described function that the presence decision was effected by mistake when an object was placed on a seat. According to the present embodiment, the above described operations allow the positive presence decision to be effected by the difference between the object and the person through the detection of the physical movement characteristics in accordance with the life activity of the human body so as to improve the accuracy of the seat control of the vehicle. The warning means 43 and the driving means 7 are controlled in accordance with the presence decision as described hereinabove, with an effect that the safety control of the moving vehicle can be maintained more positively than before.

Figure 10:
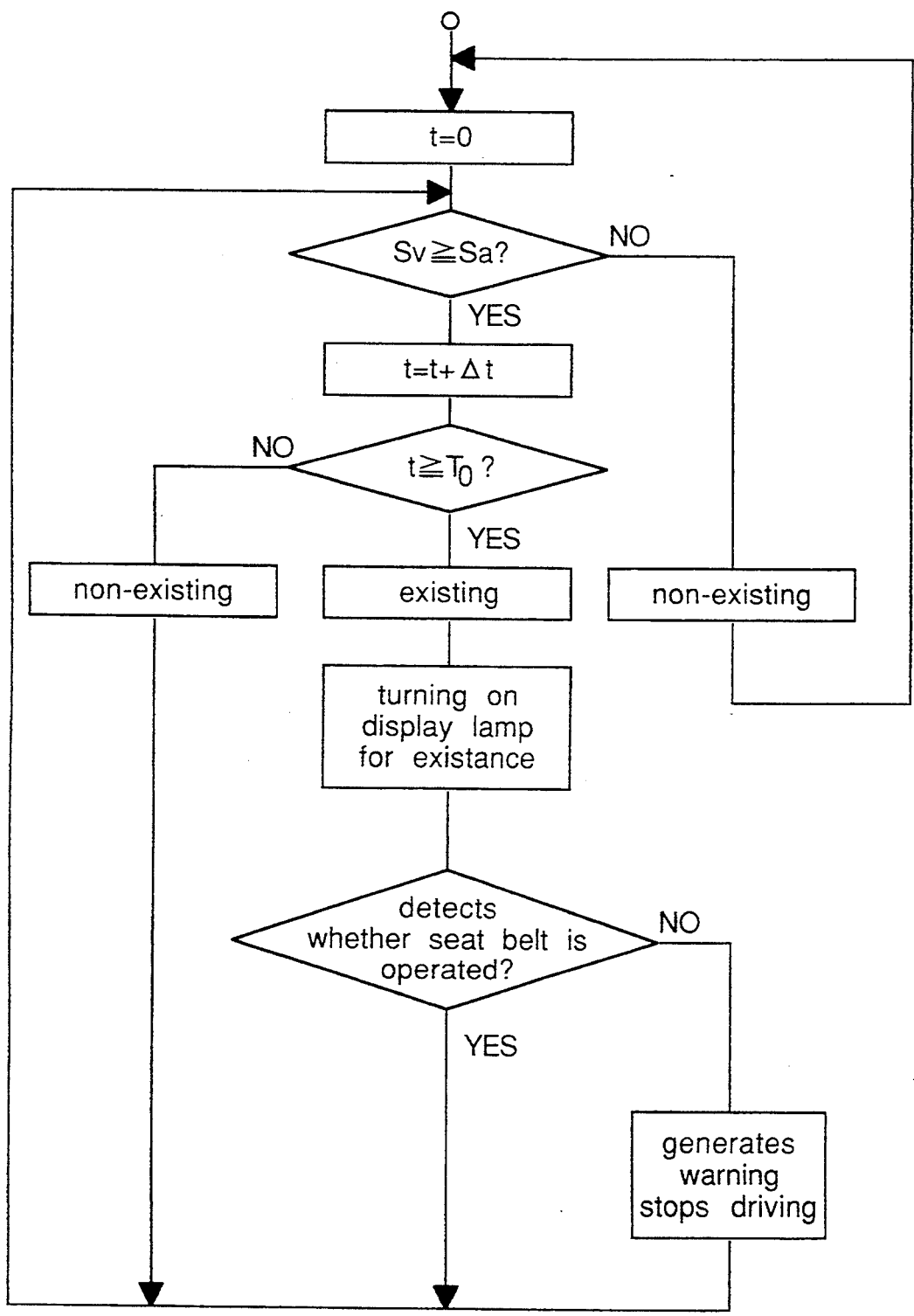

When the presence deciding means 33 determines the presence condition of the respective seats in the above described construction, the control means 42 operates the warning means 43 unless a signal showing that the engagement of the belt of the seat of the presence decision provided has been detected from the seat belt detecting means 40 is inputted so as to blink the corresponding the display lamp, so that further driving of the driving means 7 can be stopped. FIG. 10 is a flowchart showing the procedure. The moving vehicle cannot start by the above described operation unless the engagement of the seat belt is effected by the present person, with an effect that the safety of the passengers of the moving vehicle can be positively ensured.

In the above described embodiment, if an infant is left behind in a seat within the automobile, the infant will not be involved in a heat or sunstroke accident, because the presence of the left infant can be detected by the above described procedure, and a warning can be issued from the warning means 43 by the control means 42 when the presence condition has been exceeded for at least a constant time period. In this case, the warning means 43 may include activates the automobile horn.

Figure 11:
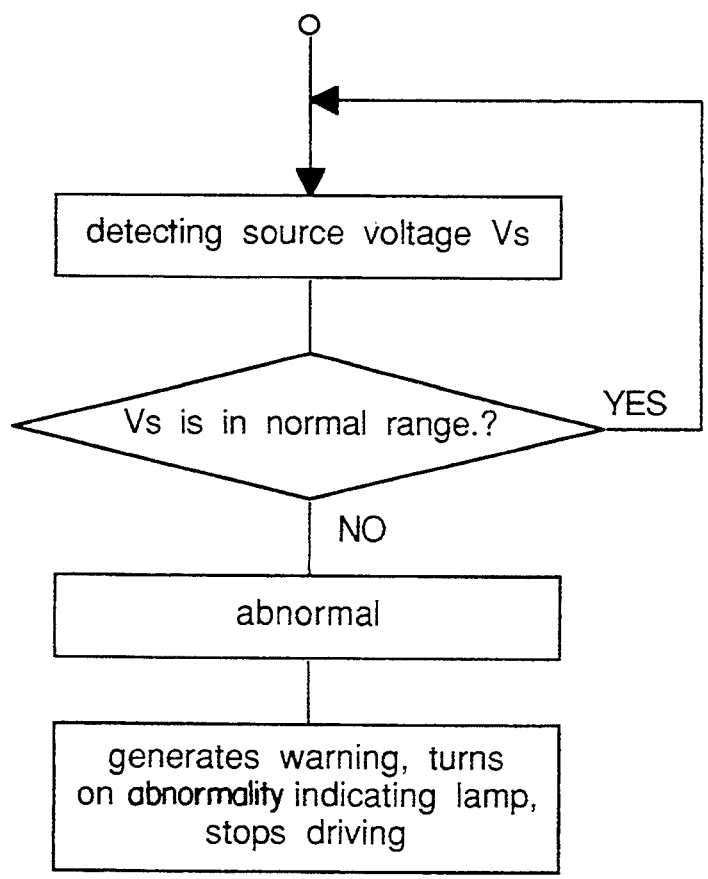

When the vibration sensor 9 or the shielded cable 21 is disconnected or shorted by the mistaken sticking of a knife or the like in the above described embodiment, the voltage between the first resistor 17 and the second resistor 20 is varied, thus resulting in the varied source voltage of the FET. The abnormality detecting means 34 detects such voltage change so as to output the abnormality signal to the control means 42. The control means 42 generates a warning from the warning means 42 in accordance with the abnormality signal so as to light the corresponding abnormality display lamps 39a through 39d and also, stop the driving of the driving means 7. FIG. 11 is a flowchart showing the procedure. By the above described function, there is an effect of positively retaining the safety of the moving vehicle if the vibration sensor 9 and the shielded cable 21 are disconnected or shorted.

Although a piezo-electric material is used as the vibration sensor 9 in the above described embodiment, an electrostatic capacity detection type of vibration sensor, an optical fiber arrangement for applying light to the human body surfaces so as to detect changes in the reflected light due to vibration, or the like can be used.

In the above described embodiment, the filter 15 has a characteristic of letting only the signal component of approximately 1 Hz through approximately 10 Hz from the input signal so as to output the physical movement signals by the heart pulse activity as the physical movement characteristics in accordance with the life activity of the human body. The filter may have a characteristic of letting the signal component of approximately 0.3 Hz through approximately 1 Hz pass for outputting the physical signals by the breathing as the above described movement characteristics.

Figure 12:
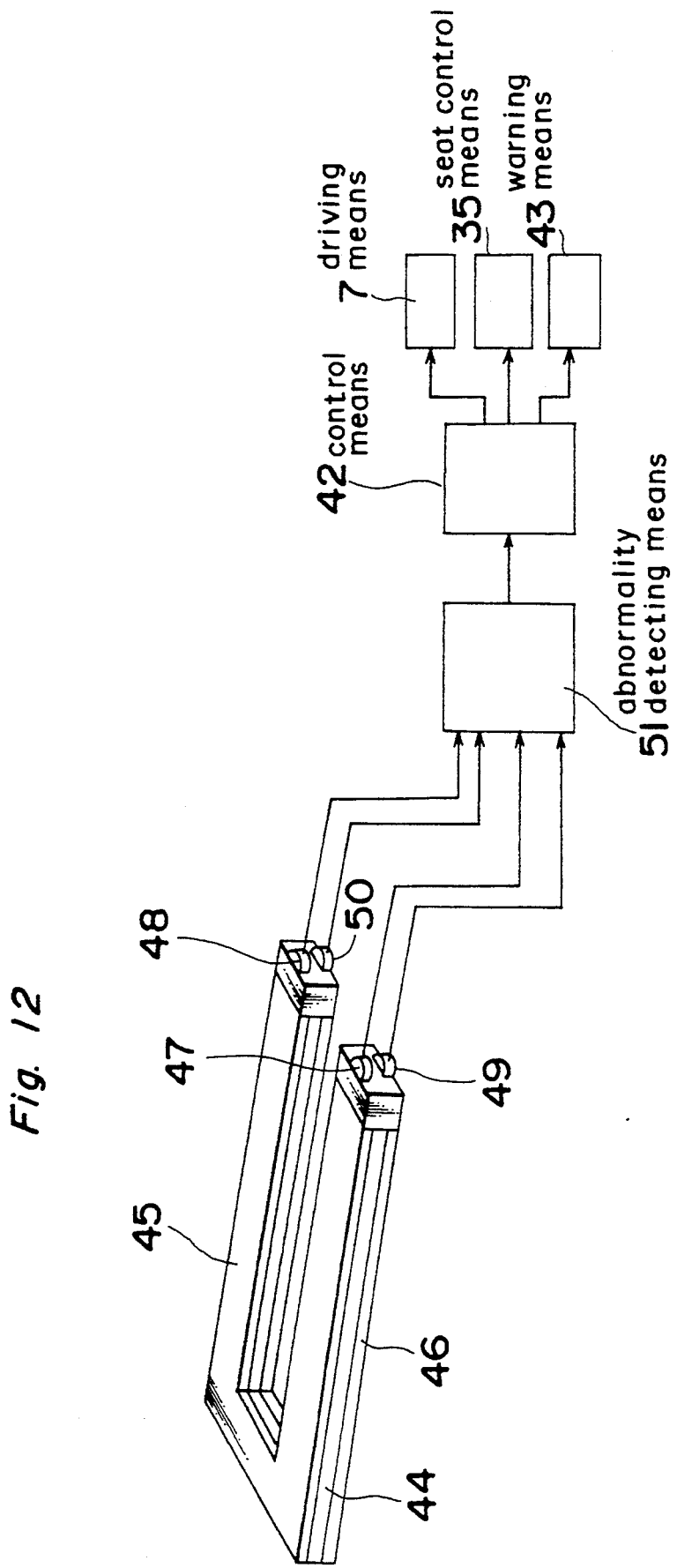
FIG. 12 is a block diagram of an apparatus in accordance with a second embodiment of the present invention.

A second embodiment of the present invention is described as follows. In the first embodiment, a plurality of seats are described. For simplifying the following description, only one seat is shown. FIG. 12 is a block diagram of the embodiment. The difference between the present embodiment and the first embodiment is that an abnormality detecting means 51 for determining the abnormality of the vibration sensor 9 by the detection of the resistance value among the connecting terminals 47 through 50 is provided with the vibration sensor 9 being composed of a macro-molecule piezo-electric material 44 of vinylden polyfluoride or the like, electrode materials 45 and 46 being fixed on both the faces of the macro-molecule piezoelectric material 44, and connecting terminals 47 through 50 provided on both the ends of the electric materials 45 and 46. As the construction is the same as in the above described conventional embodiment except for the above description, the detailed description will be omitted with the same reference numerals being provided.

Figure 13:
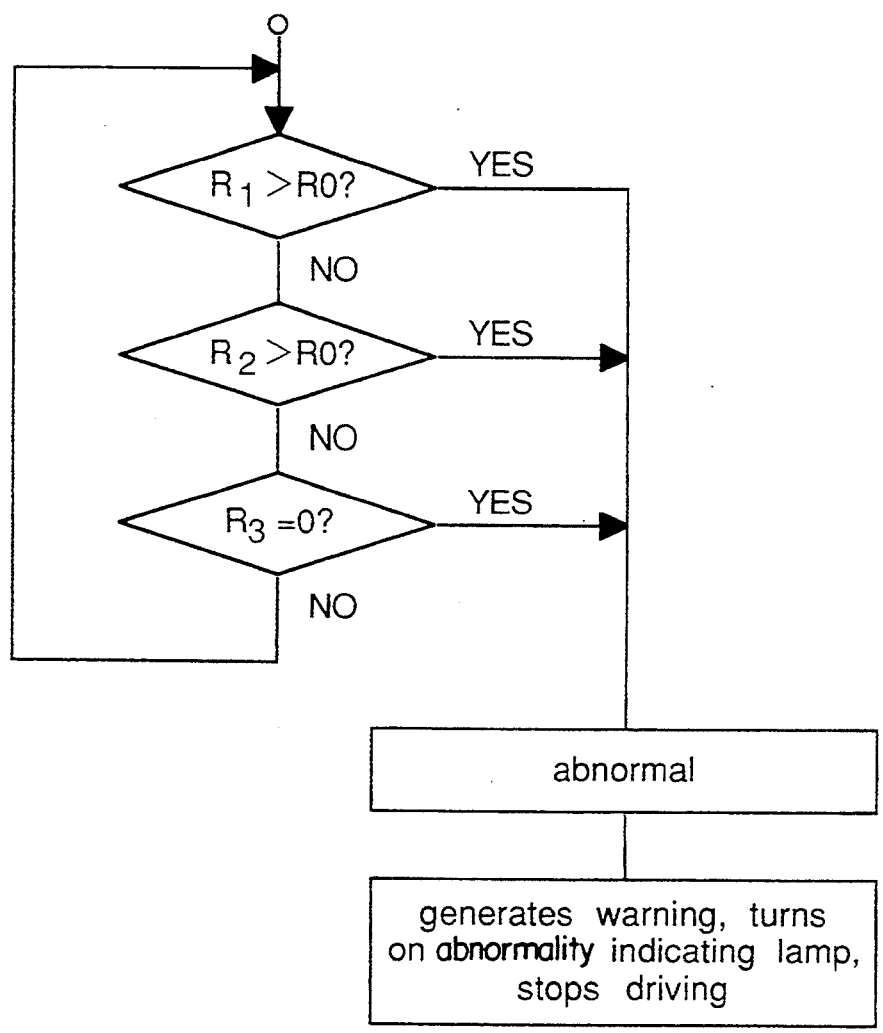
FIG. 13 is a flowchart showing an abnormal detection procedure.

As the resistance value between the connecting terminals 47 and 48 is made infinite by the above described construction if the electrode is disconnected, the abnormality detecting means 51 determines that the electrode material 45 has been disconnected if the resistance value R1 between the terminals 47 and 48 is larger than a predetermined set value Ro, and likewise, and determines that the electrode material 46 has been disconnected if the resistance value R2 between the terminals 49 and 50 is larger than Ro. Since the resistance value R3 between the terminals 47 and 49 becomes zero if there is a short in the electrode, the abnormality detecting means 51 can detect even a short of the electrode. Since the control operation when an abnormality has been detected is similar to that of the first embodiment, a detailed description thereof has been omitted. When the physical movement characteristics of the human body is detected, the operation is effected from the signal between the connecting terminals 47 and 49 or from the signal between the connecting terminals 48 and 50. A flowchart showing the procedure of the abnormality detection is shown in FIG. 13.

By the above described operation, the construction was complicated by two resistors being built in it in the first embodiment. According to the present embodiment, there is an effect in that the abnormalities of disconnection and shorts can be detected by a simple construction.

Figure 14:
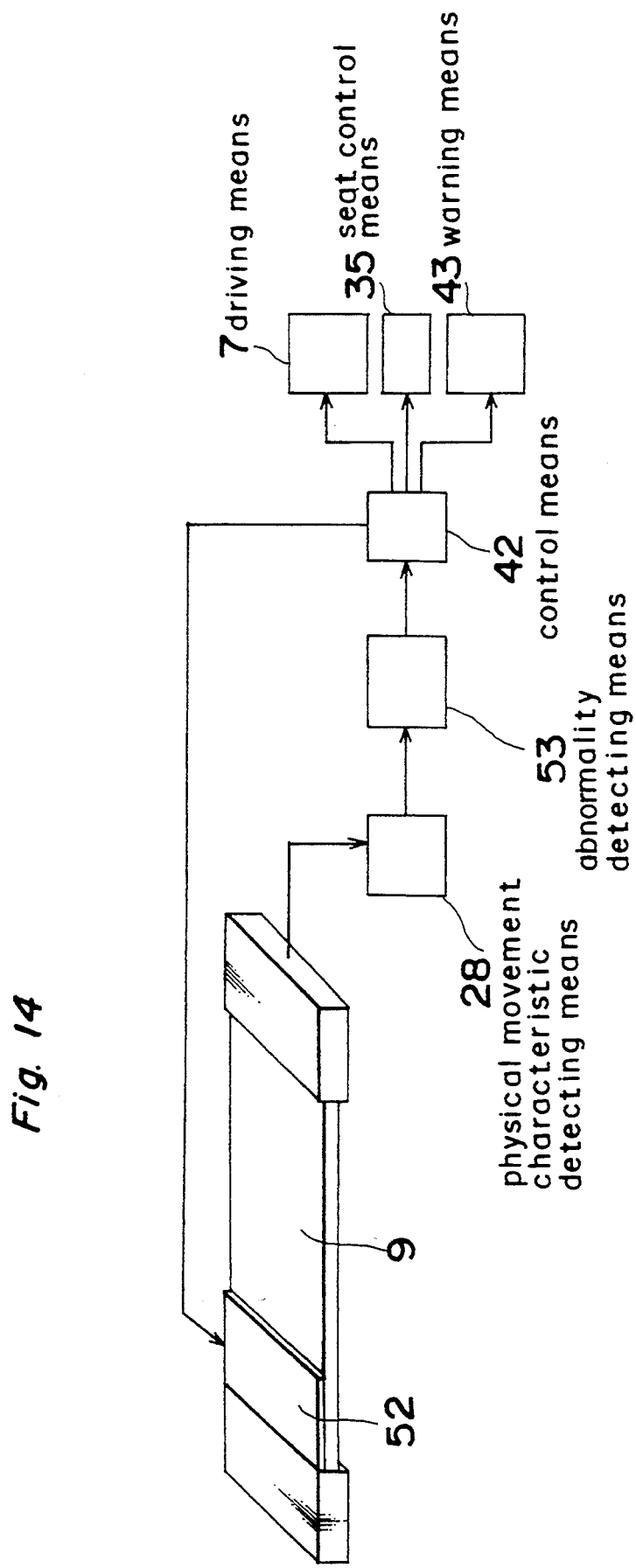
FIG. 14 is a block diagram of an apparatus in accordance with a third embodiment of the preset invention.

A third embodiment of the present invention is described as follows. In the first embodiment, a plurality of seats is described. In the following description, only one seat is shown for simplicity. FIG. 14 is a block diagram of the embodiment. The difference point between the present embodiment and the first and second embodiments is that the present invention has a vibration applying means 52 which applies a vibration of a given strength to the sensor g by a control signal from the control means 42, and an abnormality detecting means 53 determines the abnormality of the vibration sensor 9 in accordance with the output signal from the physical movement characteristic detecting means 28. The vibration applying means 52 is set to come into contact with the vibration sensor 9. Since the remainder of the construction is the same as in the other embodiments, a detailed description has been omitted.

Figure 15:
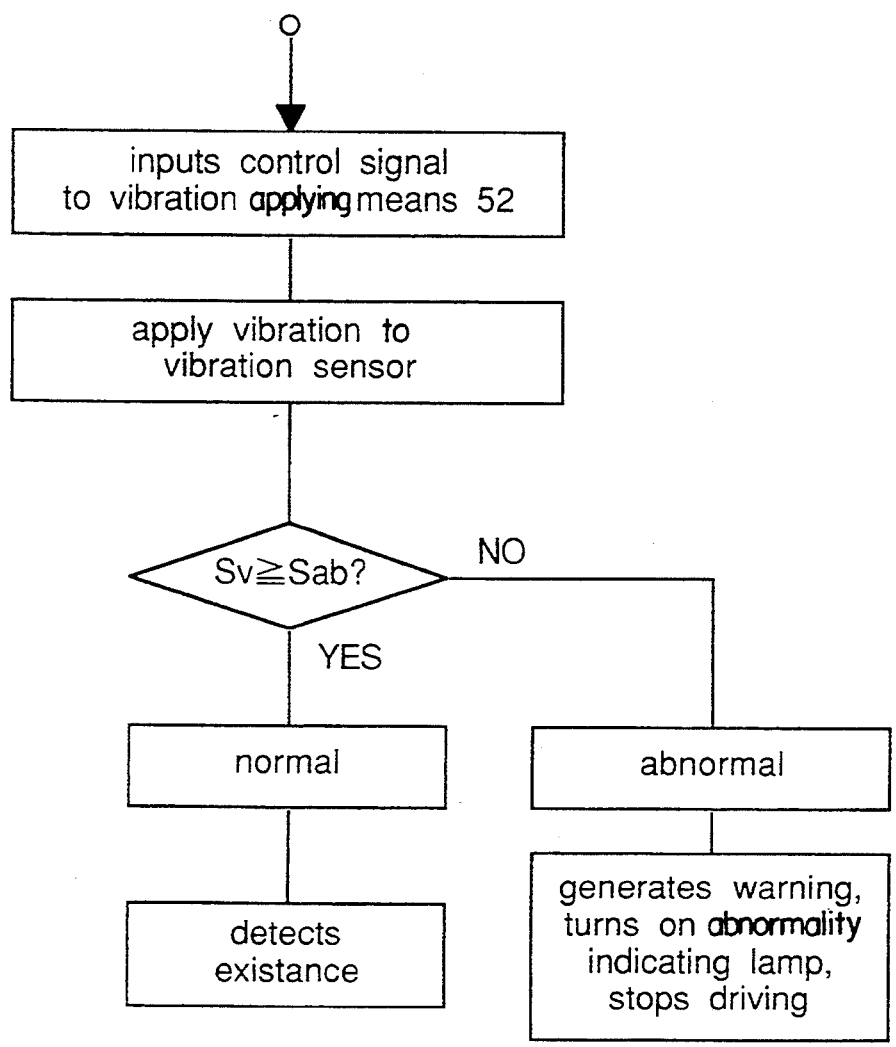
FIG. 15 is a flowchart showing an abnormal detection procedure.

The operation by the above described construction described as follows. The vibration applying means 52 is vibrated by the control signal from the control mans 42, and the given strength of vibrations are applied to the vibration sensor 9. When the vibration sensor 9 is normal, signals each having the given level are outputted in accordance with the applied vibrations. Assume that a knife is stuck into the seat such that the electrodes 11 and 12, or the shielded cable 21 of the vibration sensor 9 are disconnected or shorted; then a given level of signals are not outputted from the physical movement characteristic detecting means 28 if the given strength of vibrations are applied to the vibration sensor 9. When the composition of the piezo-electric material 10 itself is deteriorated by the exposure of the vibration sensor 9 to a high temperature environment, aging deterioration or the like, the signals of the given level are not outputted as described above even if the given strength of vibrations are applied to the vibration sensor 9. The abnormality detecting means 53 compares the output signal Sv of the physical movement characteristic detecting means 28 with the predetermined set value Sab in the application of the vibrations to the vibration sensor 9 so as to determine that $Sv \geq Sab$ is normal and $Sv < Sab$ is abnormal. FIG. 15 is a flowchart showing the procedure of the abnormality detection. A detailed description has been omitted here, because the detection of an abnormality is similar to that of the first embodiment. The vibration application to the vibration sensor 9 is controlled by the control means 42 to be effected at the start of the operation of the present apparatus or to be effected for each constant time period after the start of the operation.

In the first embodiment and the second embodiment, the disconnection or shorting of the electrode of the vibration sensor 9 are detected by the above function so as to detect an abnormality. When the abnormality has been caused in the signal conversion member itself for converting the vibrations by the physical movements into electrical signals, namely, when the abnormality that the given outputting operation cannot be effected due to the deterioration of the composition by the exposure of the piezo-electric material 10 itself to a high temperature environment, or by the aging deterioration or the like in the first and second embodiments, there is a problem that the abnormality cannot be detected. As the abnormality is detected in the third embodiment in accordance with the output signal when the given vibrations are applied to the vibration sensor 9, the abnormality of the signal conversion member itself is also detected, with an effect that further a safety control apparatus of higher reliability in practice can be provided.

Figure 16:
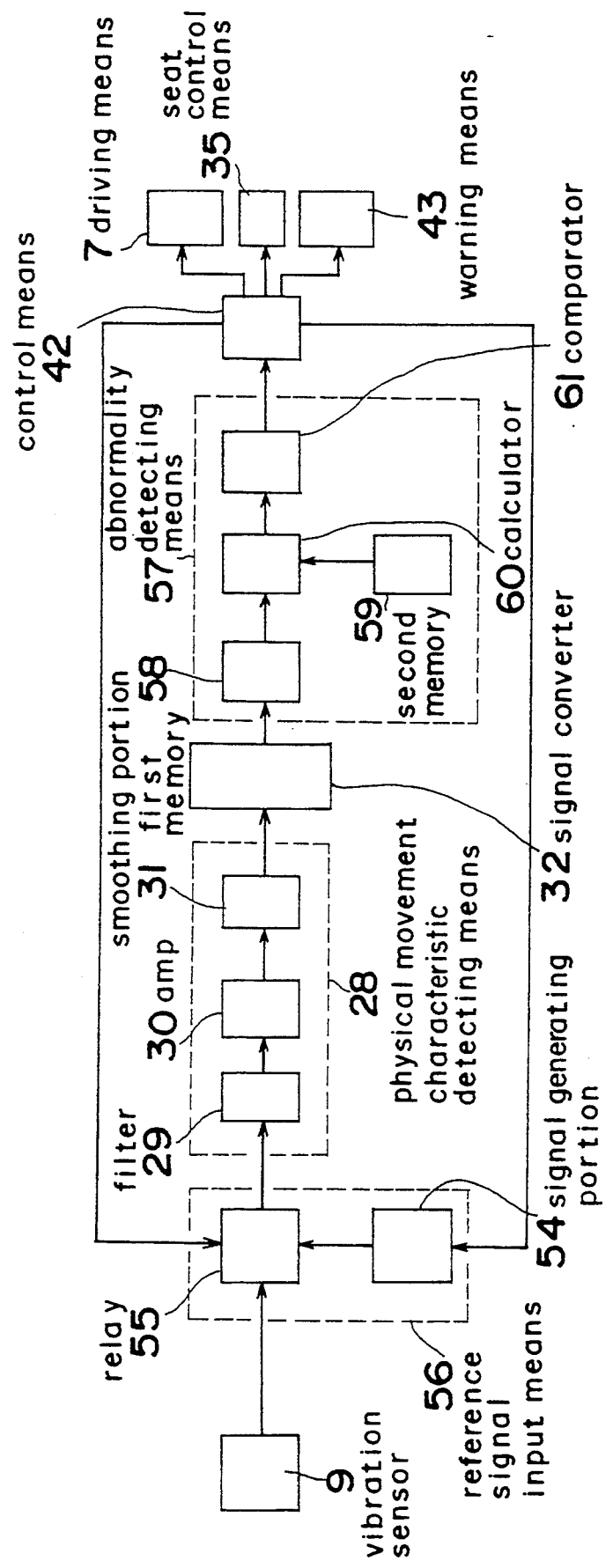
FIG. 16 is a block diagram of an apparatus in accordance with a fourth embodiment of the present invention.

A fourth embodiment of the present invention is described as follows. In the first embodiment, a plurality of seats is described. Only one seat is provided in the following description for brevity. FIG. 16 is a block diagram of a fourth embodiment. The different points between the present embodiment and the first, second and third embodiments are that the present embodiment is provided with a reference signal input means 56 having a signal generating portion 54 for generating predetermined reference signals by the control signal from the control means 42, a relay 55 for switching a signal transmission path between the vibration sensor 9 and the physical movement characteristic detecting means 28 into a signal transmission path between the signal generating portion 54 and the physical movement characteristic detecting means 28 by the control signal from the control means 42, and an abnormality detecting means 57 for detecting the abnormality of the physical movement characteristic detecting means 28 in accordance with the output signal of the physical movement characteristic detecting means 28 in the inputting operation of the above described reference signal, the abnormality detecting means 57 being composed of a first memory 58 for storing the output signals of the smoothing portion 31, a second memory 59 having reference waveforms stored therein in advance, a calculator for computing the mutual correlation coefficients between the output waveforms stored in the first memory 58 and the standard waveforms stored in the second memory 59, a comparator 61 for comparing the output signal of the calculator 60 with a predetermined set value. The construction except for it is the same as in the above described embodiments, and a detailed description has been omitted.

Figure 17:
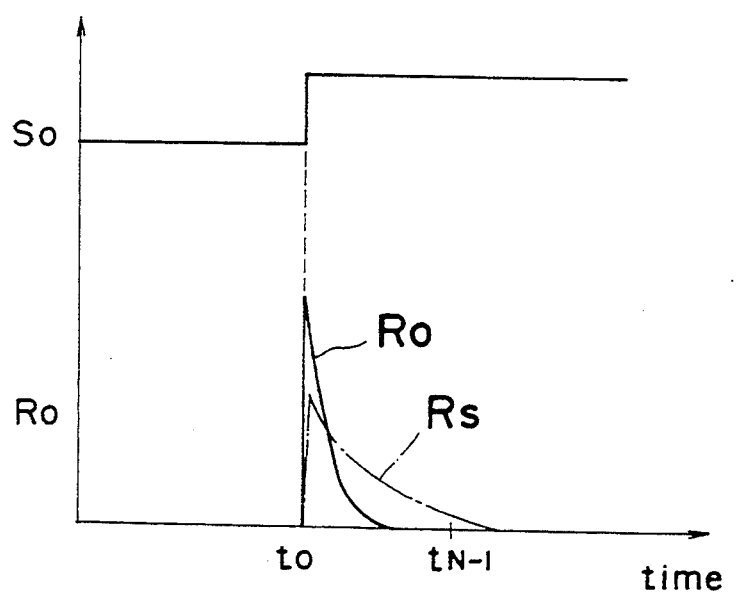
FIG. 17 are output waveforms from the smoothing portion during an abnormal detection.
Figure 18:
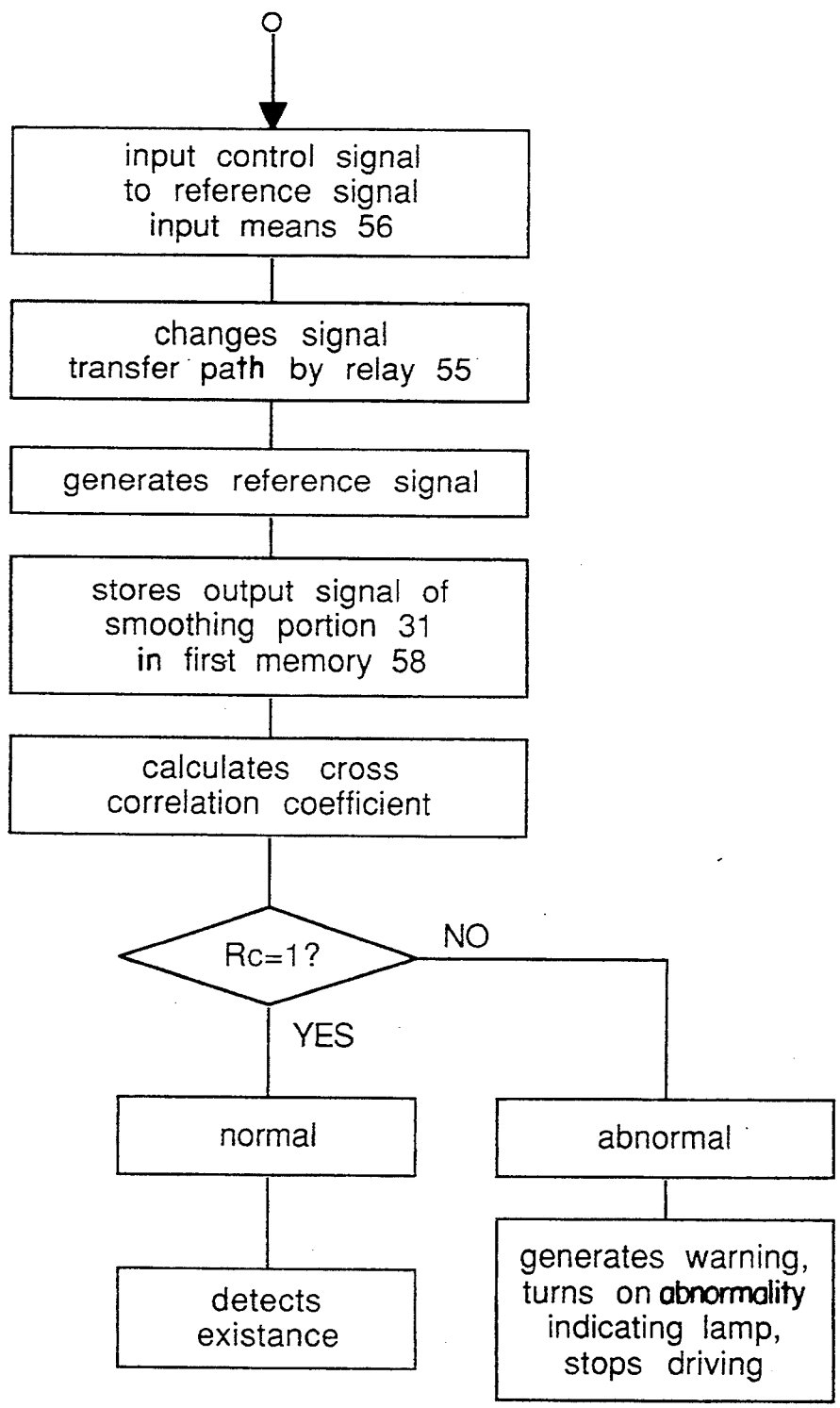
FIG. 18 is a flowchart showing an abnormal detection procedure.

The function by the above described embodiment is described as follows. An output signal Ro of the smoothing portion 31 when the reference signal So is applied to the filter 29 is stored in advance in the second memory portion 59 when nothing is wrong with the filter 29, or amplifier 30, or smoothing portion 31. For example, FIG. 17 shows the output signal Ro of the smoothing portion 31 in the amplifying operation upon the filter 29 of the step input as So, with a solid line showing the signal Ro. N is the number of the data Ro (0) through Ro (N-1) from time $t_0$ till $t_{n-1}$ with So being applied upon it among data A/D converted data with the sampling interval $\Delta t$ of the signal Ro being stored in advance in the second memory portion 59. In the abnormality decision, a relay 55 is switched with a signal from the control means 42 so as to input into the filter 29 the signal from the signal generating portion 54. In this case, as the output signal of the vibration sensor 9 is not inputted to the filter 29, because the signal transmission path is interrupted by the relay 55. When the step input So is applied to the filter 29 at a given step width, the output signal Rs of the smoothing portion 31 at that time is stored in the first memory 58. Namely, the signal Rs is converted in the A/D converter at the sampling interval $\Delta t$ by the signal converting means 32, and N number of data Rs (0) through Rs (N-1) from the time $t_0$ to the time $t_{n-1}$ are stored in the first memory 58. The calculator 60 calculates the cross correlation coefficient Rc equation (1) between Ro and Rs $$Rc = \frac{1}{M} \sum_{x=0}^{N-1} |Ro(x) \cdot Rs(x)|, \qquad \text{Equation (1)}$$

where, $$M = \sum_{x=0}^{N-1} Ro(x)^2$$

in accordance with the equation (1). Rs becomes different in wave form from Ro as shown by the chain line of FIG. 17 if something is wrong with either the filter 29, the amplifier 30, or the smoothing portion 31. Therefore, the comparator 61 detects an abnormality if Rc is not equal to 1, and detects no abnormality if Rc is equal to 1. The controlling operation is effected by the control means 42 so that the input to the filer 29 of the reference signal is effected at the starting of the present apparatus or is effected for each constant time period after the start. FIG. 18 is a flowchart showing the abnormality detection procedure.

In the above described first through third embodiments, there is a problem in that the abnormality of the physical movement characteristic detecting means 28 cannot be detected even if the abnormality of the vibration sensor 9 can be detected. In the present embodiment, the abnormality of the physical characteristic detecting means 28 can be detected by the comparison between the output signal in a case where the predetermined reference signal has been inputted to the physical movement characteristic detecting means 28 with the reference waveform stored in advance, with an effect that a safety control apparatus of higher reliability can be provided.

The above described first embodiment, second embodiment, third embodiment and fourth embodiment may be combined. The abnormalities of both the vibration sensors and the physical movement characteristic detecting means can be provided, with an effect that a presence detecting apparatus of higher reliability can be provided.

Figure 19:
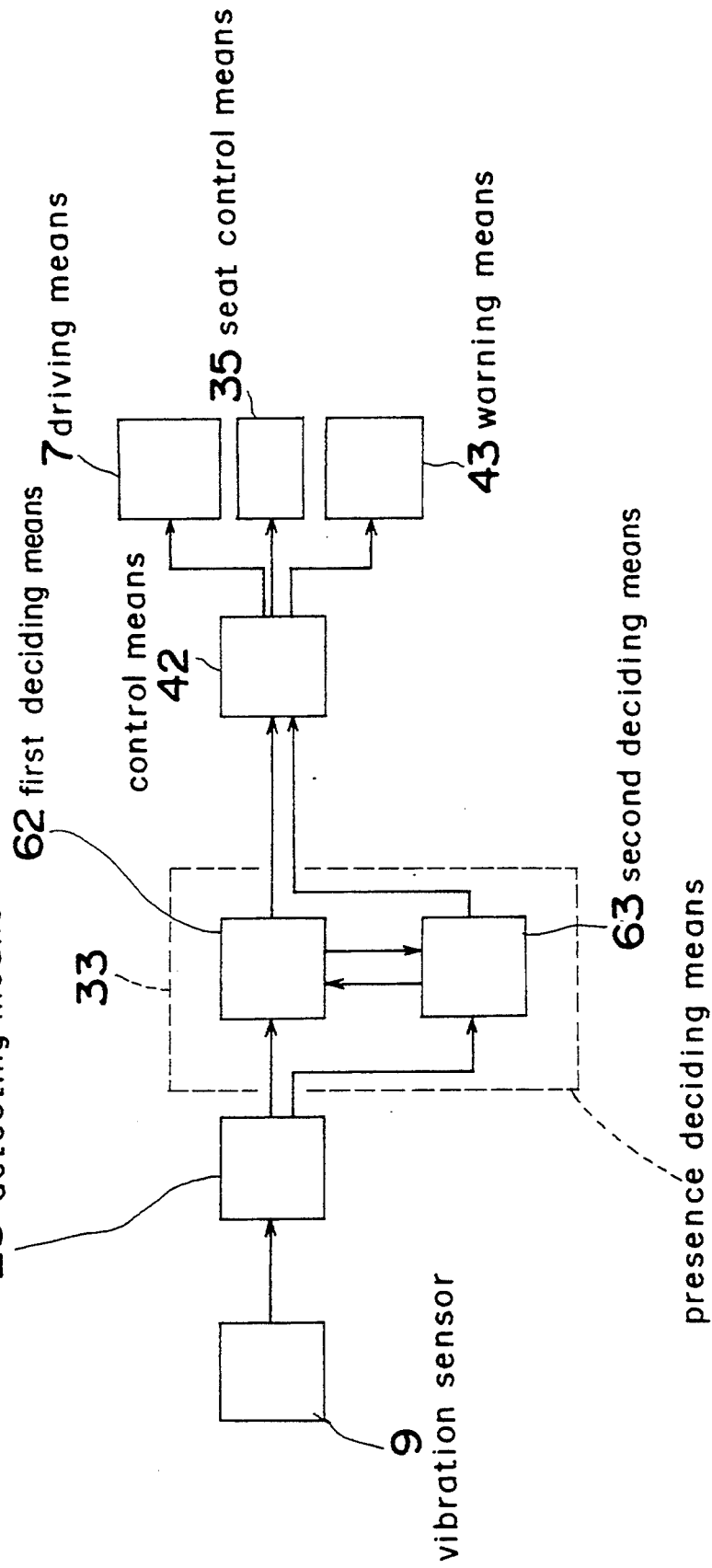
FIG. 19 is a block diagram of an apparatus in accordance with a fifth embodiment of the present invention.

A fifth embodiment of the present invention is described as follows. Only one seat is provided in the following description for brevity. FIG. 19 is a block diagram of the present embodiment. The different points between the present embodiment and the first through fourth embodiments are that as shown in FIG. 19, the presence deciding means 33 is composed of a first deciding means 62 and a second deciding means 63. The first deciding means 62 detects a presence of a passenger if the output signal of the physical movement characteristic detecting means 28 is at least a first predetermined value, and detects an absence if the output signal is less than the predetermined set value. The second deciding means 63 detects an absence until the output signal of the physical movement characteristic detecting means 28 is at least a predetermined second set value if an absence detection is effected by the first deciding means 62, and decides whether or not a passenger is present in accordance with the first deciding means 62 when the output signal of the physical movement characteristic detecting means 28 is at least the second set value.

The operation by the above described construction is as follows. When the presence is detected in a moving vehicle such as automobile, train, passenger plane or the like, the physical movement signals by the heart activity of and the breathing of the human body are detected by the vibration sensor 9 and the physical movement characteristic detecting means disposed in the seat as described in the first embodiment if the vehicle is stopped or if the vehicle runs on a smooth road so as to decide if a human body is present. When the vehicle is moving on a rough road signals similar to the physical movement signals may appear from the physical movement characteristic detecting means 28 in spite of a fact that the person actually does not exist because of the vibrations from the moving vehicle itself and the vibrations from the road. The presence judgment may be wrong in such a case. In order to solve such a problem, the present embodiment was developed.

Figure 20:
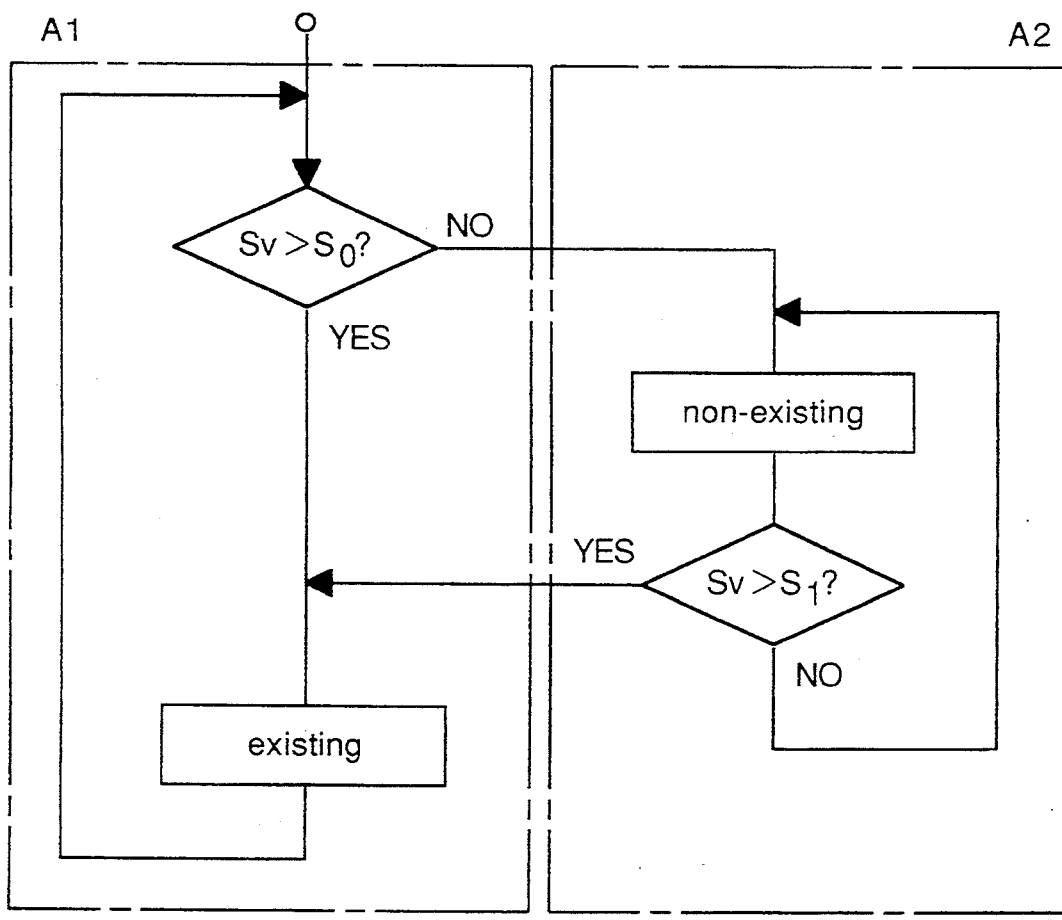
FIG. 20 is a flowchart of the presence decision in the same embodiment.
Figure 21:
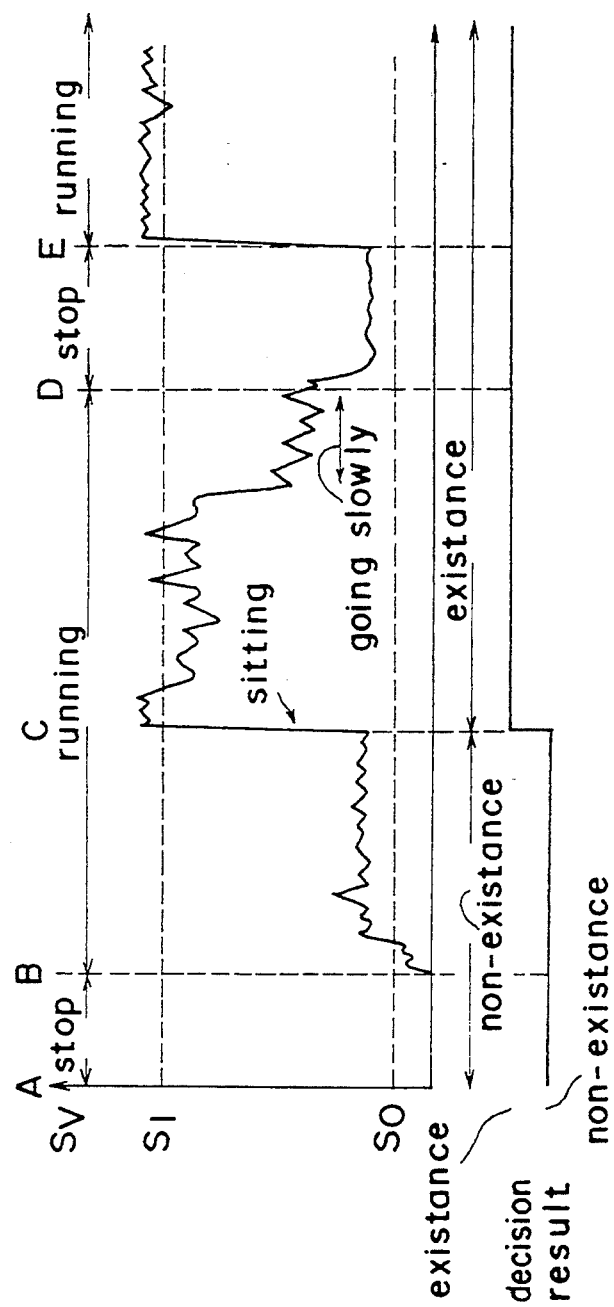
FIG. 21 and FIG. 22 are views showing the output signal of the physical movement characteristic detecting means and the presence decision results.
Figure 22:
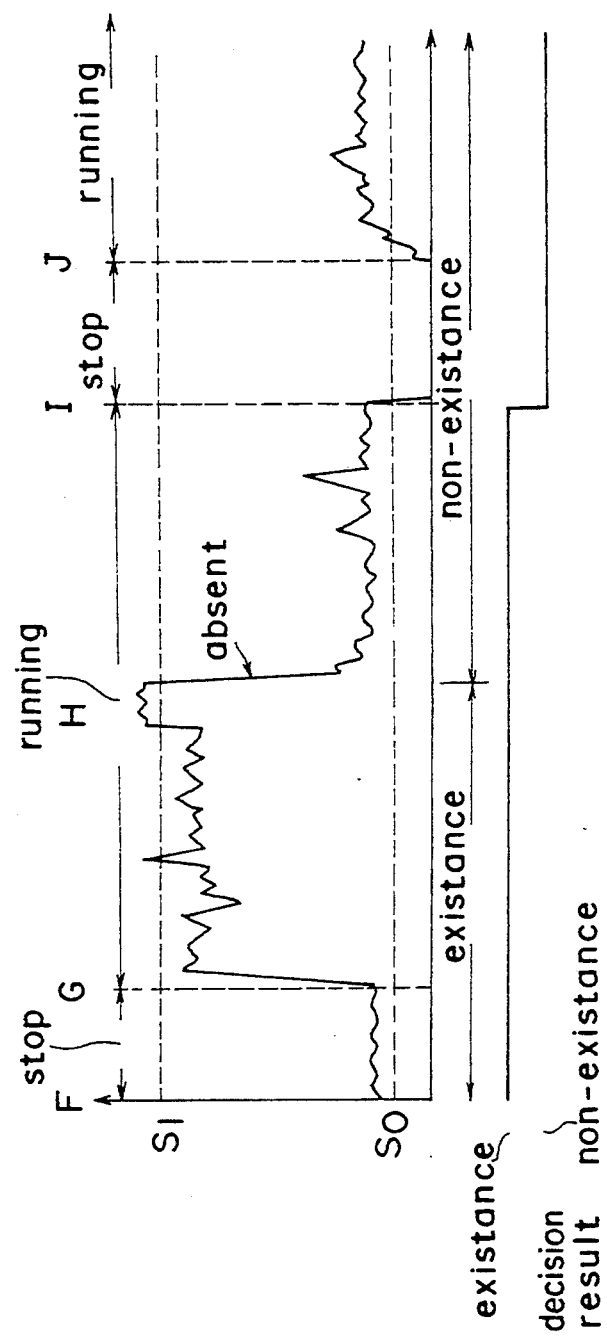

FIG. 20 is a flowchart of a decision algorithm. Reference numeral A1 shows a processing flow by the first deciding means 62, and reference numeral A2 shows a processing flow by the second deciding means 63. A human body exists if the output signal Sv of the physical movement characteristic detecting means 28 is at least a predetermined first set value So in the first deciding means 62, and a human body does not exist otherwise. If an absence is determined, the decision of the absence is retained until the Sv is at least a predetermined second set value S1 or more in the second deciding means 63. If the Sv is at least S1, it is determined whether or not the person exists again in accordance with the first deciding means 62. The deciding operation will be concretely described further in accordance with the FIG. 21 and FIG. 22. Both FIG. 21 and FIG. 22 show the Sv as the time passes in cases were the vehicle is stopped or running. FIG. 21 shows a case where a vehicle starts running with a person being absent, and then a person sits on a seat during the running. FIG. 22 is a case where a vehicle starts running when a person is seating, and a person leaves the seat during the running and is not present. If the Sv<So at a time A, the first deciding means 62 decides that no persons exist in the case of FIG. 21. At the time A and thereafter, the second deciding means 63 effects the decision. The running of the vehicle starts from the time B, and Sv≧So becomes under the influence of the vibrations due to the running. The decision of the absence is maintained until the time C when Sv<S1. When a human body sits on a seat at a time C, Sv becomes larger by the impact of the sitting operation. If Sv≧S1, the deciding operation is moved to the first deciding means 62. In the first deciding means 62, it is decided that the person is present on the seat when Sv≧So. If the vehicle stops at the subsequent time D through E, the physical movement signal by the heart activity and the breathing of the human body is detected. The decision of the presence is continued due to Sv≧So.

Since Sv≧So by the detection of the physical movement signal as described hereinabove at the time F since the human body is present from the beginning in the case of FIG. 22, the first deciding means 62 decides that a passenger is present on the seat. Since Sv≧So if the moving vehicle starts its running until the subsequent time H, the decision of the presence is continued. When the human body leaves the seat at the time H, Sv≧So the influence of the vibrations by the running in spite of the actual absence. In this case, an error may be caused in the decision. Since Sv<So is provided when the vehicle stops at the time I, it is decided by the first deciding means 62 that no passenger exists. Subsequently, the second deciding means 63 maintains the decision of the absence until Sv≧.

Figure 23:
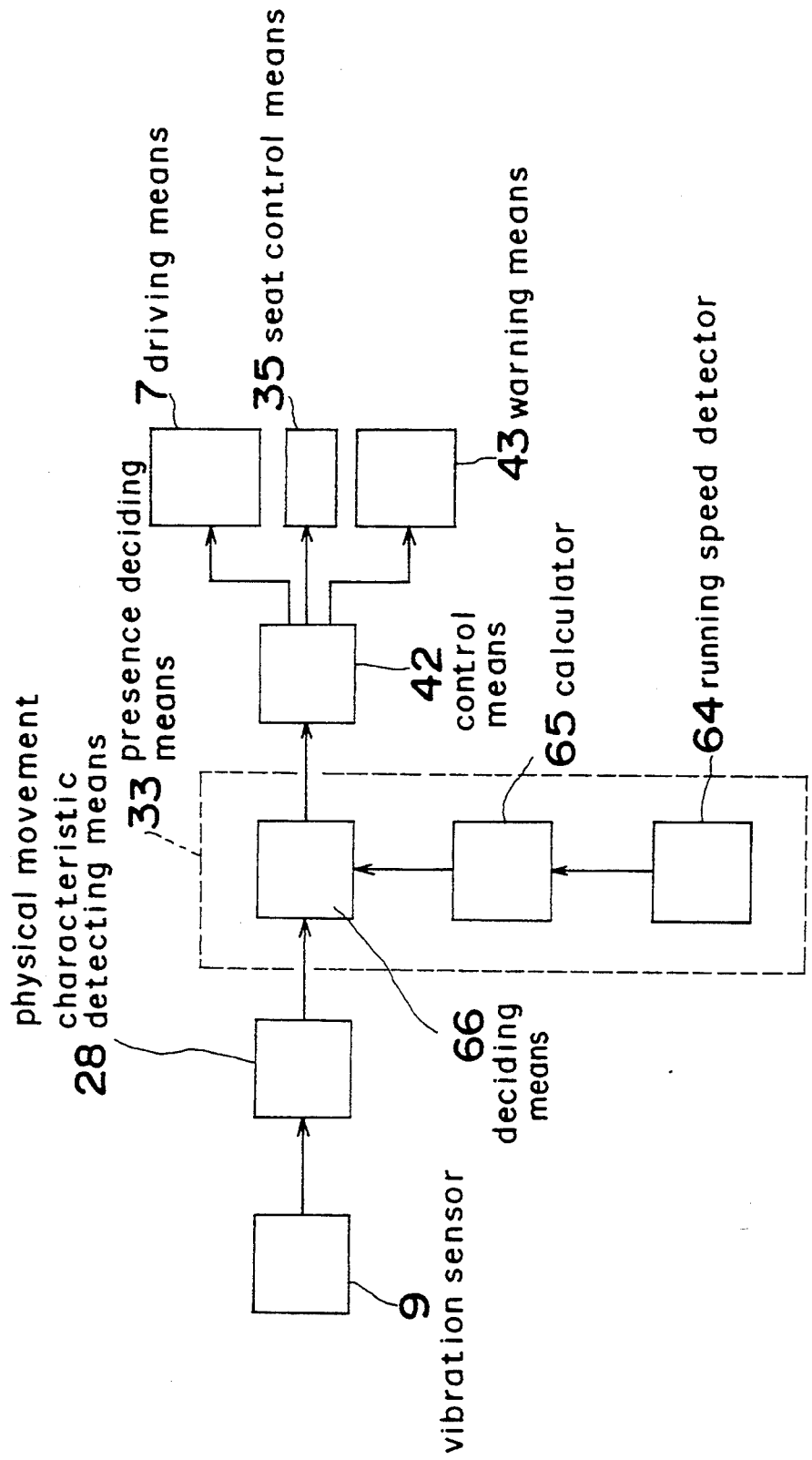
FIG. 23 is a block diagram of an apparatus in accordance with a sixth embodiment of the present invention.

A sixth embodiment of the present invention is described hereinafter. In the first embodiment, a plurality of seats are described. Only one seat is provided in the following description for brevity. FIG. 23 is a block diagram of the present embodiment. The different points between the present embodiment and the first through fifth embodiments are that as shown in FIG. 23, the presence deciding means 33 is composed of a running speed detector 64 for detecting the running speed of the moving vehicle, calculator 65 for calculating the set value in accordance with the output signal of the running speed detector 64, a deciding means 66 for deciding whether or not a person is present in accordance with the comparison between the output signal of the physical movement characteristic detecting means 28 and the above described set value.

Although the decision as to whether a person exists is effected by the provision of two set values So and S1 in the above described fifth embodiment, there is a problem in that Sv≧ So is sometimes provided by the vibrations during the running in spite of the actual absence of a person who was present and then leaves the seat during the running, so that a decision error may occur. A sixth embodiment has been designed to solve such a problem, and the description thereof follows.

Figure 24:
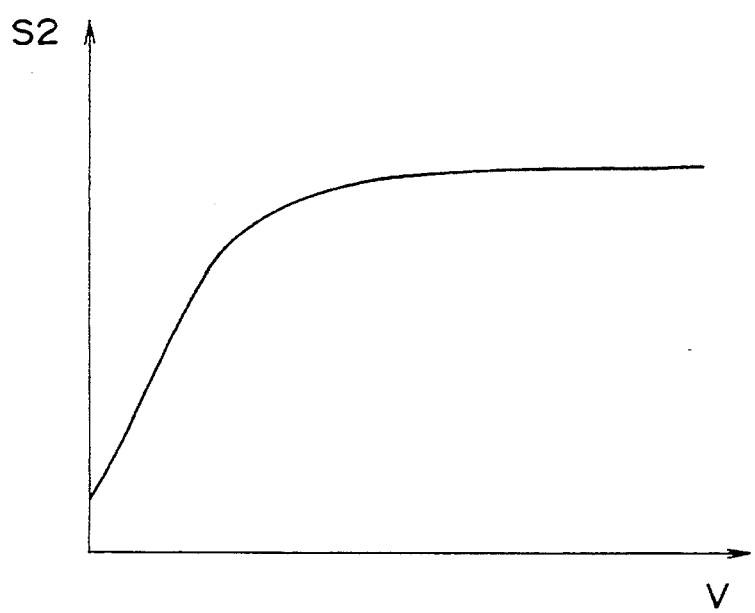
FIG. 24 is a diagram showing the relationship between the running speed and the set value for the presence decision.

By the above described construction, the running speed detector 64 receives a signal from a speedometer of, for example, the moving vehicle so as to detect the running speed V of the moving vehicle; the calculator 65 calculates the set value S2 for determining the presence in accordance with the speed V. The relationship between the speed V and S2 at this time is shown in FIG. 24. The relationship between the speed V and S2 can be obtained by experiment. The decision means 66 compares the output signal Sv of the physical movement characteristic detecting means 28 with the set value S2 so as to decide that a person exists if S2≧Sv and to decide that no person exists if Sv<S2.

Figure 25:
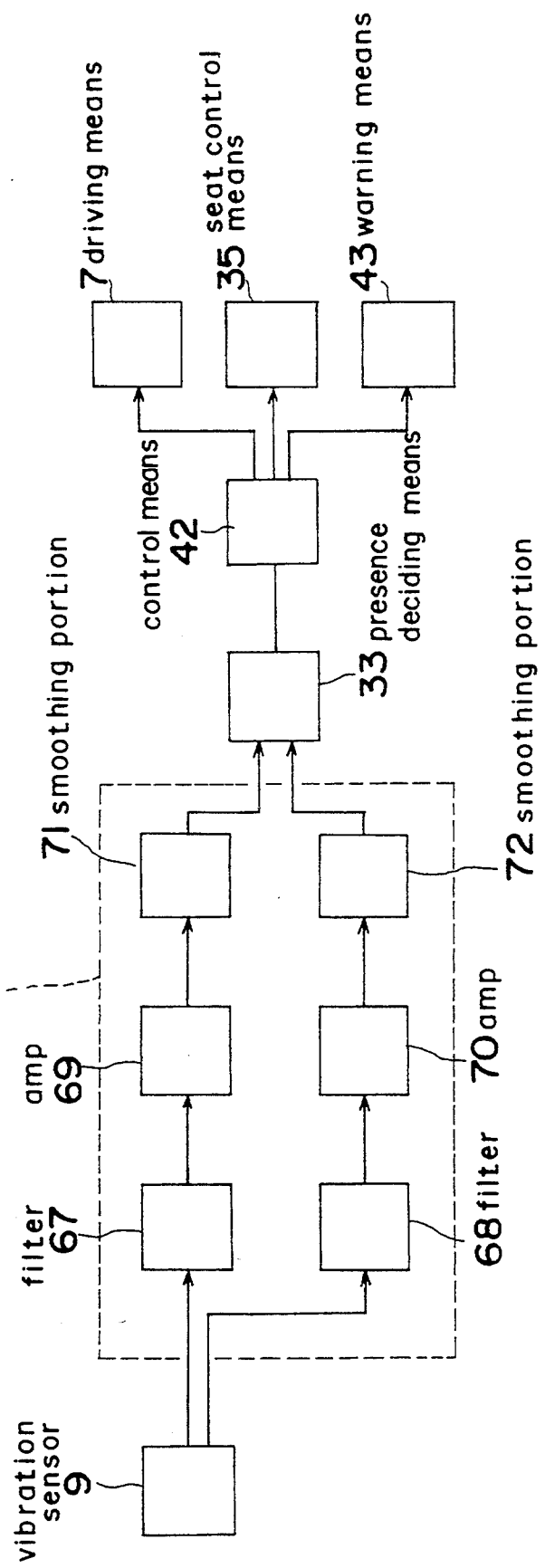
FIG. 25 is a block diagram of an apparatus in accordance with a seventh embodiment of the present invention.

A seventh embodiment of the safety control apparatus of the present invention is described below. Although a plurality of seats are described in the first embodiment, only one seat is provided in the following description for brevity. FIG. 25 is a block diagram of the present embodiment. The different points between the present embodiment and the above described first through sixth embodiments are that as shown in FIG. 25, the physical movement characteristic detecting means 28 is provided with two filters 67 and 68 for filtering the specific frequency components of the respective output signals of the vibration sensor 9, amplifiers 69 and 70 and smoothing portions 71 and 72, and the presence deciding means 33 decides whether or not a person is present in accordance with the output signals of both smoothing portions 71 and 72.

Figure 26:
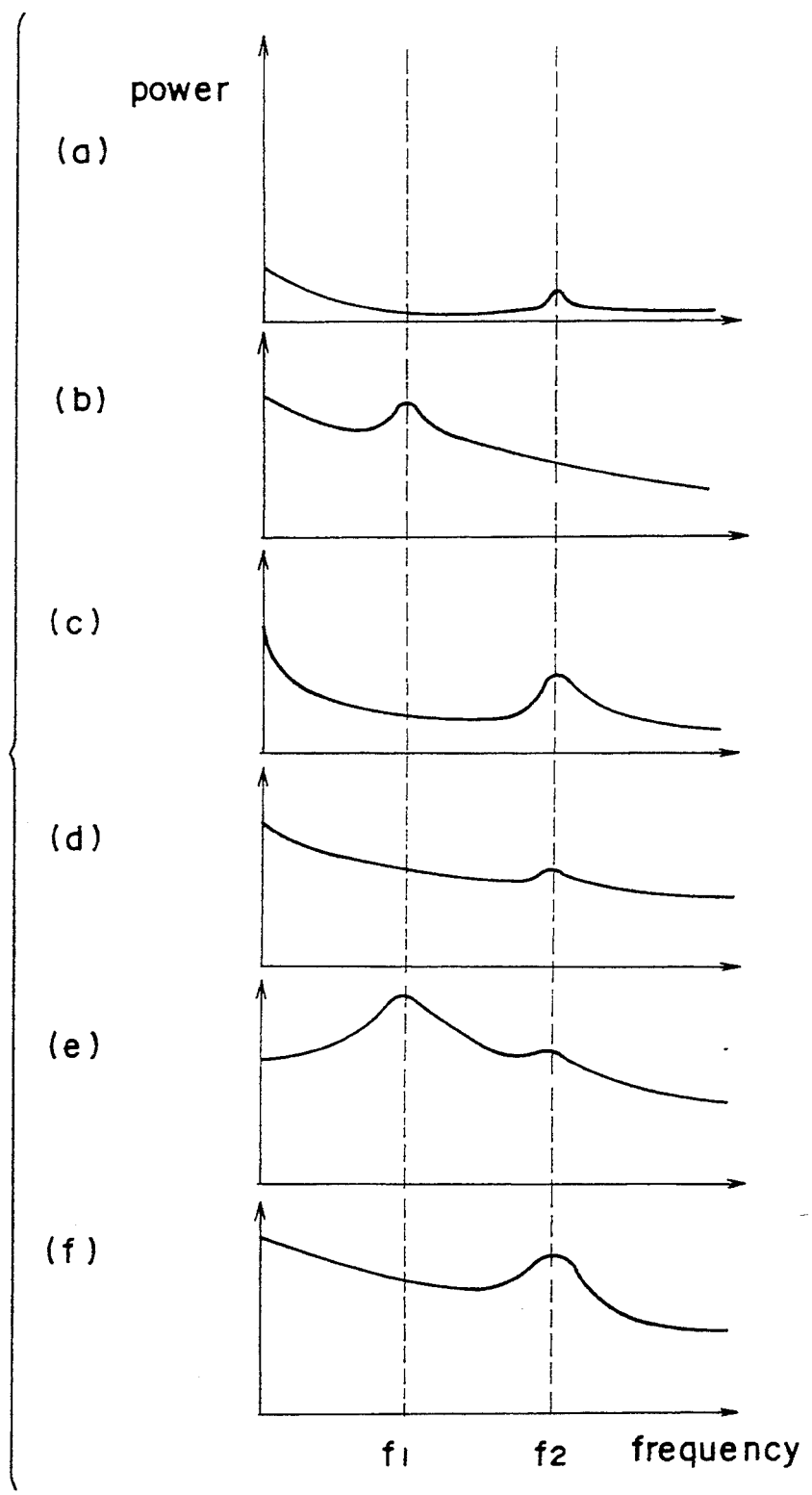
FIG. 26 graphically shows the frequency analysis of the output signal from the vibration sensor.

The operation by the above described construction is described hereinafter. FIG. 26 shows the frequency distribution of the signals in each condition. An idling condition where a car engine is operated and the car is stopped is taken into consideration. In a case where neither person nor object is placed on the seat 8, vibrations caused by the engine are spread to the vibration sensor 9 so as to generate minute signals. As the signals are closely related to the engine, a frequency distribution having minute peak is shown in the frequency f1 as shown in FIG. 26 (a). When the human body sits on the seat 8, the hands and legs move. When the body leaves the seat, the whole body moves. The output signal of the vibration sensor 9 is also large, and the frequency components are varied by the moving. When a person who sits on the seat keeps quiet, outputs which are comparatively low in level are generated by the close physical movements of the body to be spread by the heart activity and the breathing of the human body. When the car is stopped, the outputs show the frequency distribution which becomes a peak at the frequency f1 of 10 Hz or less as shown in FIG. 26 (b). When an object is placed on a seat 8, the frequency distribution which becomes slightly larger in the signal component of the f2 of the frequency distribution of FIG. 26(a) is shown in FIG. 26(c), because signals are generated by the vibrations of an object to be excited through the vibrations by the engine.

Figure 27:
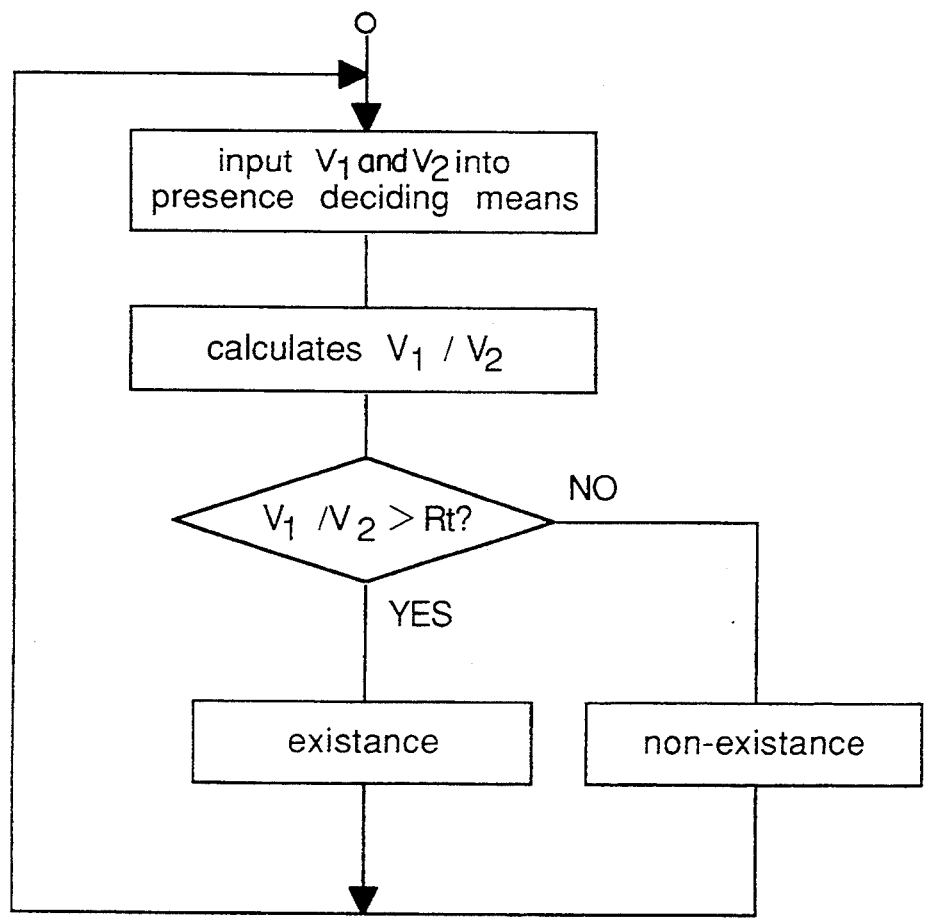
FIG. 27 is a flowchart of the presence decision in the same embodiment.

The operation when the car is running is described hereinafter. As the vibrations spread from the road face are added to the vibrations caused by the engine in a condition where neither person nor object is placed on the seat, and piezo-electric elements disposed on the seat are vibrated even when the human body is not provided on the seat so as to cause the outputs larger than that shown in FIG. 26(a). The output signal has a close relationship to the vibrations of the engine as in the case of FIG. 26(a), and a frequency distribution having a peak at a frequency f2 higher than 10 Hz is shown in FIG. 26 (d). When a person sits on a seat and drives a car, two components as shown in FIG. 26(b) and FIG. 26(d) are multiplied. The vibrations of the human body to be excited by the running vibrations are added so that the output signal from the piezoelectric element becomes the frequency distribution as shown in FIG. 26 (e). When an object is placed on a seat during the running, the vibrations of the object excited by the vibrations during the running are added to the signal component shown in FIG. 26(d) by the vibrations during the running, without the signals of FIG. 26(b) which is the signal component due to the subtle physical movement of the human body, so that the frequency distribution, as shown in FIG. 26(f), of the respective larger levels of the frequency distribution of FIG. 26(c) occurs. As the size of the signal of the frequency f1 f1 is equal to the size of the signal when a car is stopped with a person sitting on a seat, it is difficult to tell the difference between them. In the present embodiment, a frequency f2 which becomes a peak of a signal by the vibration during the running of the car, in addition to a frequency f1 which becomes a peak of a signal by the subtle physical movement of the human body, is noticed. Assume that the size of a signal of the frequency component of f1 and f2 are respectively V1 and V2, then V1, which becomes a signal component due to the subtle physical movement of the human body becomes larger, and is equal to V2 when the car is stopped, and is V2 or more during the running. In the case of the presence of an object, V1 becomes extremely small during the stopping and running, thus resulting in V1<V2. Therefore, the difference between the person and the object can be provided even during the running. The presence is shown by V1/V2>Rt with the decision constant Rt being determined in advance, and the absence is provided in V1/V2<Rt. In the present embodiment, the output signal from the vibration sensor 9 is divided into the respective components of f1 and f2 by two filters consisting of a filter 67 for filtering the frequency component of f1, and a filter 68 for filtering the frequency component of f2. The respective output signals are amplified by the respective amplifiers 69 and 70, and are smoothed by the smoothing portions 71 and 72 and are fed to the presence deciding means 33. The respective output signals are compared with as described hereinabove so as to decide the presence or absence of the person. FIG. 27 is a flowchart showing the decision procedure.

By the division of the output signal of the vibration sensor disposed on the seat into a plurality of frequency components so as to compare the size of the respective signals by the above described operation, signals by the small physical movements of the human body to be spread by the heart activity and the breathing activity in the quiet condition of a person sitting on the seat, and signals to be generated by the vibrations during the running of the car are compared so as to decide the absence and presence of the person. The difference from a case where an object is placed even during the running can be made, thus allowing the presence detection within the compartment to be effected without error.

In the above described embodiment, the presence decision is effected by the comparison between the output signals from the physical movement characteristic detecting means 28 and the previously determined set values.

Figure 28:
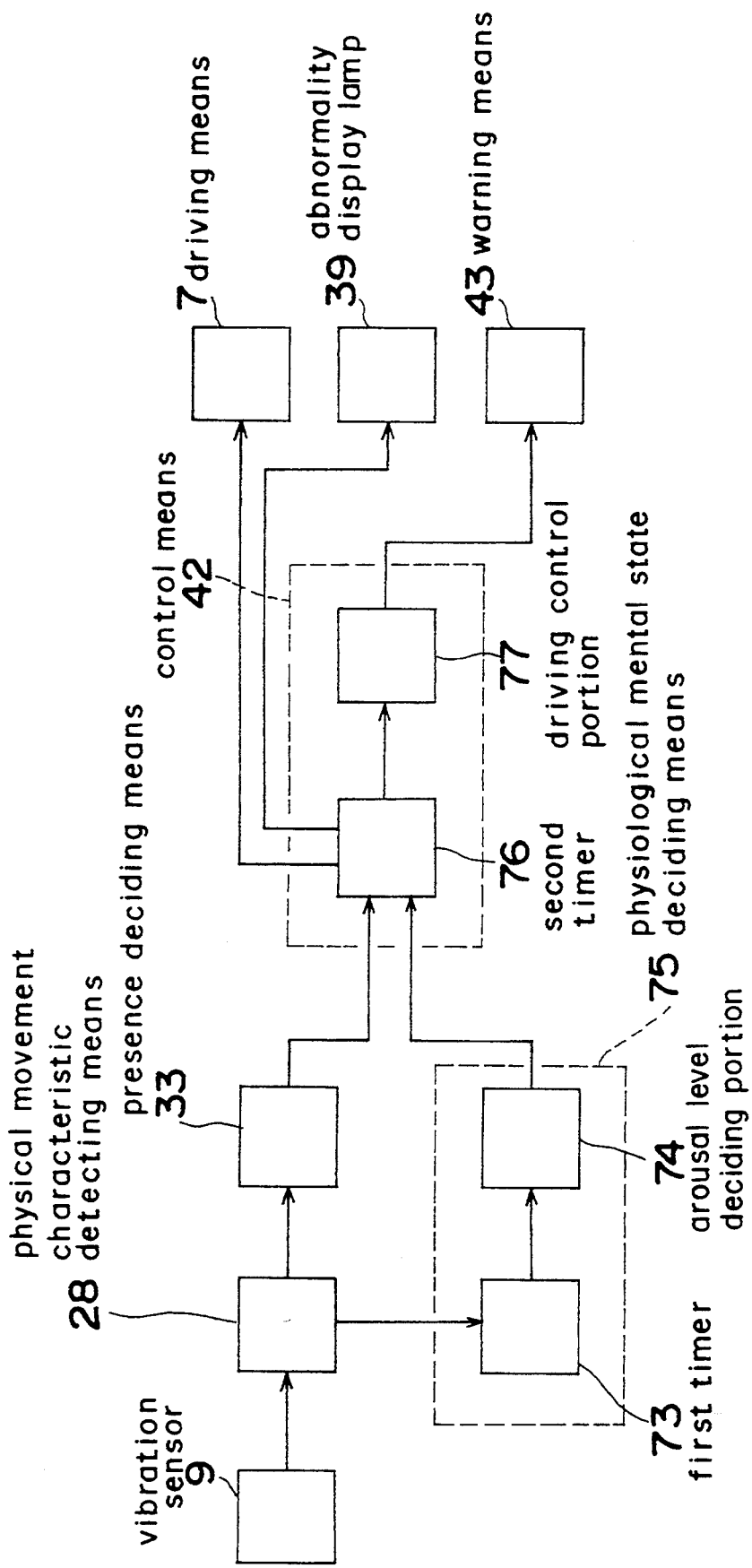
FIG. 28 is a block diagram of an apparatus in accordance with an eighth embodiment of the present invention.

An eighth embodiment of the safety control apparatus of the present invention is described hereinafter. Although a plurality of seats are described in the first embodiment, only one seat is provided in the following description for brevity. FIG. 28 is a block diagram of the present embodiment. The different points between the present embodiment and first through seventh embodiments are that as shown in FIG. 28, a physiological mental state deciding means 75 is provided with both a first timer 73 to operate if the physical movement signals to be inputted from the physical movement characteristic detecting means 28 are within the predetermined set range, and an arousal level deciding portion 74 for deciding the arousal level of the present person in accordance with a clocking signal inputted from the first timer 73, a control means 42 is provided with a second timer 76 to operate if the arousal level deciding signal inputted from the physiological mental state deciding means 75 is beyond the predetermined set range with a presence signal from the presence deciding means 33 being inputted, a driving control portion 77 is provided for stopping the driving of the driving means 7 if the clocking signal of the second timer 76 is at least a predetermined set time; a warning generating means 43 is provided for generating warnings by the operation of the second timer 76, and an abnormality display lamp 39 which blinks due to the operation of the second timer 76 is also provided.

Figure 29:
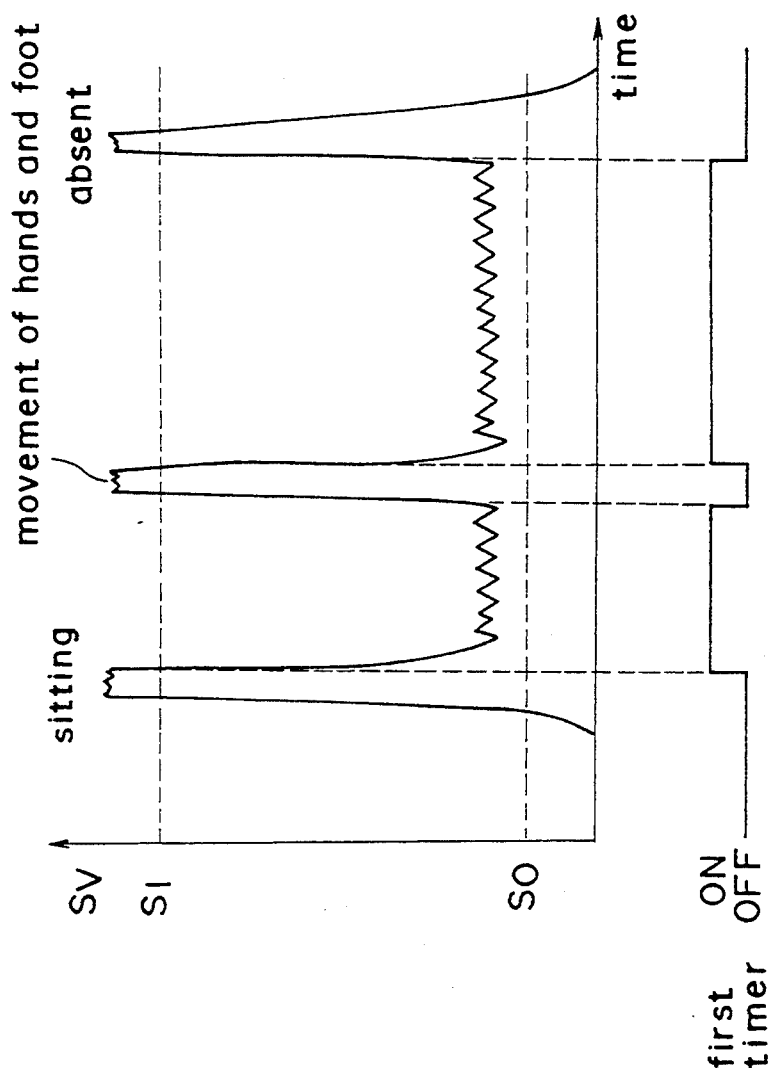
FIG. 29 are output waveforms from the physical movement characteristic detecting means in the same embodiment.
Figure 30:
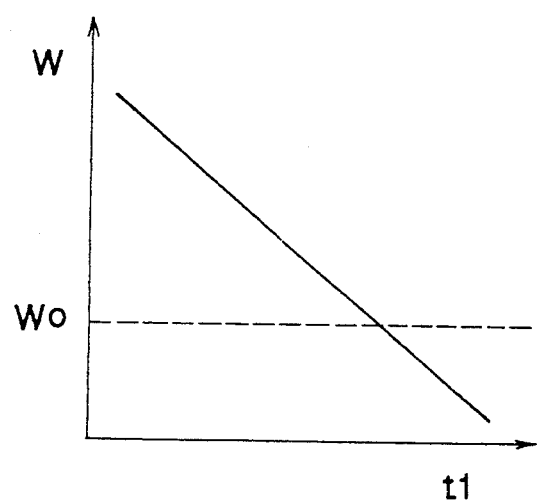
FIG. 30 is a graph showing the relationship between the clock time of a first timer in the same embodiment, and the awakening level thereof.
Figure 31:
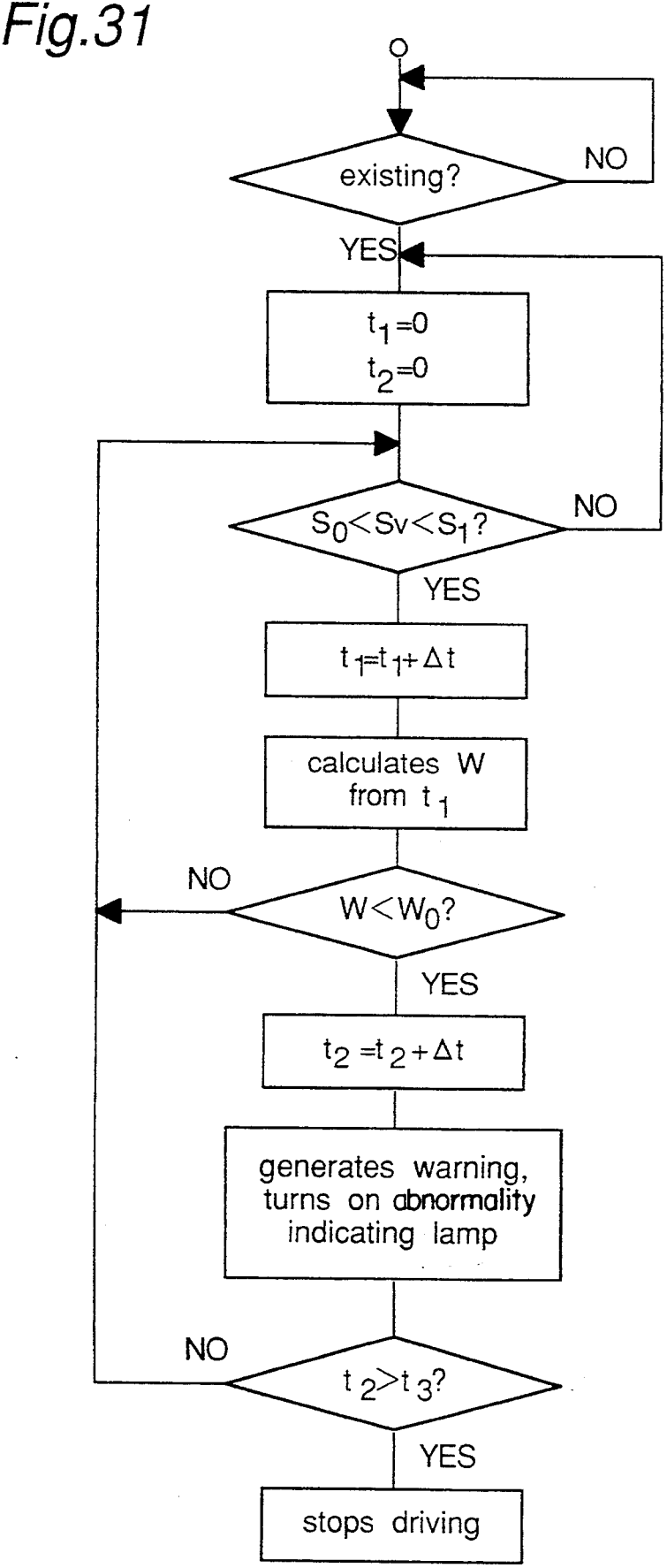
FIG. 31 is a flowchart showing the control procedure in the same embodiment.

The operation by the above described construction is described hereinafter. When the presence on a certain seat is decided by the presence deciding means 33, the first timer 73 is operated if the physical movement signal inputted from the physical movement characteristic detecting means 28 is within the predetermined set range in the physiological mental state deciding means 75 and the arousal level deciding portion 74 decides the arousal level of the present person in accordance with the clocking time counted by the first timer 73. FIG. 29 shows the output signal Sv from the physical movement characteristic detecting means 28. In the physiological mental state deciding means 75, set values So, S1, Sv shown in the drawing are compared with Sv. The first timer 73 starts its clocking operation if So<Sv<S1. Here So and S1 are the same as the value shown in the above described first embodiment. The arousal level deciding portion 74 decides the arousal level w of the present person in accordance with the clocking time t1 of the first timer 73. The arousal level W and the clocking time t1 are generally in a relationship as shown in FIG. 30. The relationship between W and tl is stored in advance in the arousal level deciding portion 74. As the tl becomes longer in the same drawing, the arousal level W becomes lower. In the control means 42, the second timer 76 operates so as to start its clocking operation if W is a set value, Wo shown in FIG. 29, or lower, and the warning means 43 generates a warning so as to blink the abnormality display lamp 39. If the clocking time t2 of the second timer is at least the predetermined set time t3, the driving control portion 77 stops its driving of the driving means 7. FIG. 31 is a flowchart showing the above described procedure.

The arousal level is obtained, by the above described operation, in accordance with the quiet time of the physical movements of the present person so as to generate a warning when the arousal level has been lowered so as to control of stopping of the driving of the moving vehicle when the condition continues, with an effect that the safe operation of the vehicle can be maintained.

Figure 32:
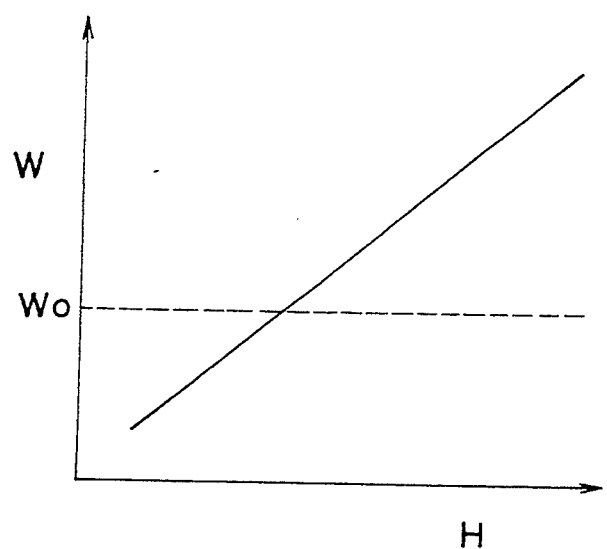
FIG. 32 is a graph showing the relationship between the number of heart pulses and the awakening level.

Although the arousal level was to be obtained from the physical movement quiet time of the present person in the above described embodiment, the physiological mental state deciding means 75 may be composed of a heart pulse detecting portion for detecting the heart pulse rate of the present person in accordance with the physical movement signals inputted from the physical movement characteristic detecting means 28 and an arousal level deciding portion for deciding the arousal level in accordance with the heart pulse signal inputted from the heart pulse detecting portion. In the heart pulse detecting portion, the calculation of the heart pulse rate is detected from the peak interval of the physiological movement signal. In this case, the self correlation coefficient may be calculated from the physical movement signal so as to obtain the heart pulse rate from the basic period. The relationship between the heart pulse rate H and the arousal level W is shown in FIG. 32. It is generally known that the arousal level W is lowered in accordance with the reduction of the heart pulse rate as shown in the same drawing. The arousal level deciding portion calculates the arousal level W in accordance with the relationship shown in the same drawing. The control means 42 effects a safety control operation similar to the above described embodiment if, for example, W is Wo or lower in accordance with the calculation value so that the safe operation of the vehicle can be retained. Although the arousal level is decided in the above described arousal level deciding portion, heart disease, such as cardiac failure may be detected.

Figure 33:
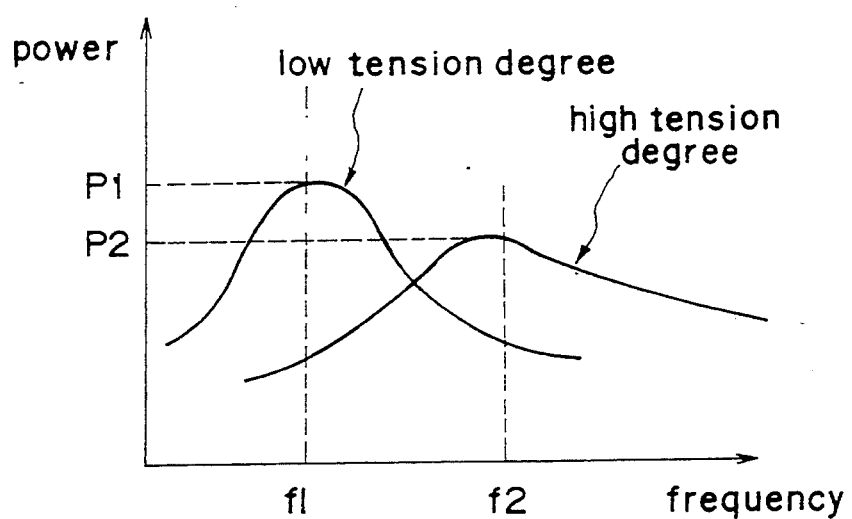
FIG. 33 is a graph showing the relationship between the frequency analysis of the output signal from the vibration sensor, and the tension degree thereof.
Figure 34:
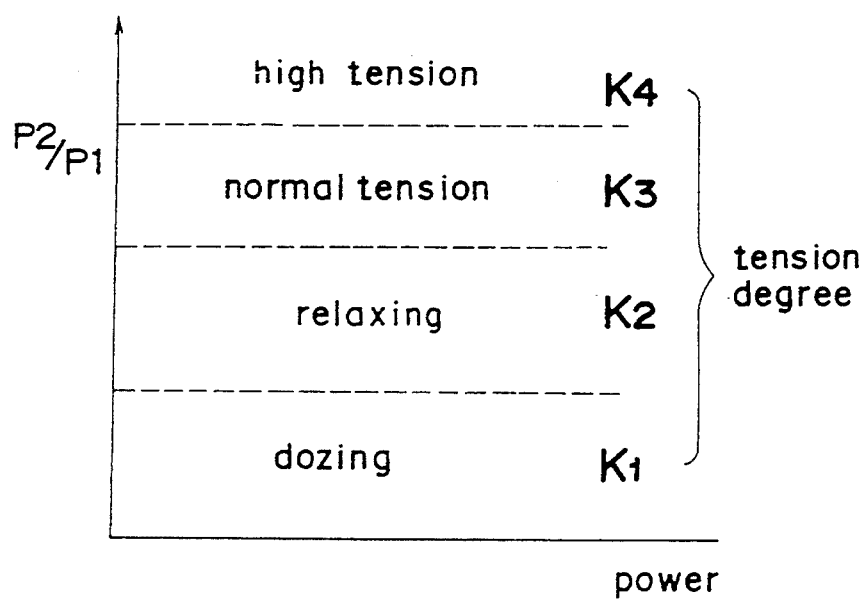
FIG. 34 is a chart showing the relationship between the P2/P1 level and the tension degree.

The physiological mental state deciding means 75 as the other embodiment may be composed of a calculating portion for effecting the frequency analysis of the physical movement signal inputted from the physical movement characteristic detecting means 28 and a tension degree deciding portion for deciding the mental, physical tension degree of the present person in accordance with the frequency analysis signal to be inputted from the above described calculating portion. FIG. 33 shows the relationship of the frequency analysis results of the physical movement signal of the present person and the tension degree of the present person detected by the vibration sensor. As the present person becomes tense as shown in the same drawing, the peak of the frequency distribution of the physical movement signal becomes the side of the high frequency. As the present person is relaxed, the peak becomes the side of the low frequency. The ratio P2/P1 is obtained about the powers p1 and p2 in the respective frequencies f1 and f2 as shown in FIG. 33 in the above described tension degree deciding portion in accordance with it, and the tension degree k is calculated in accordance with the FIG. 34. FIG. 34 conceptually shows the relationship between the ratio P2/P1 and the tension degree k (K1 through K4). In the control means 42, such same safety control operation as in the above described embodiment is effected if K is in the region of k1 and k4 in accordance with the calculated tension degree k so that the safe operation of the moving vehicle can be retained.

Although the present invention has been fully described by way of example with reference to the accompanying drawings, it is to be noted here that various changes and modifications will be apparent to those skilled in the art. Therefore, unless otherwise such changes or modifications depart from the scope of the present invention, they should be construed as being included therein.

What is claimed is:

1. A safety control apparatus of a moving vehicle such as vehicle or the like comprising a support member for having a human body placed on it so as to support it for its free moving operation, a driving means for moving the support member with a power source, a vibration sensor disposed in one portion of a seat placed on the support member, a physical movement characteristic detecting means for detecting the physical movement characteristics in accordance with the life activity of the human body with the signals from the vibration sensor, a presence deciding means for judging whether or not the human body is present on the seat in accordance with the physical movement signal to be inputted from the physical movement characteristic detecting means, and a control means for controlling the driving condition of the driving means in accordance with the presence signal from the presence deciding means.

2. The safety control apparatus as defined in claim 1, further comprising a seat reserving means for making reservations of seats, the control means comparing a seat reserving signal to be inputted from the seat reserving means with a presence signal to be inputted from the presence deciding means so as to control the driving condition of the driving means.

3. The safety control apparatus as defined in claim 1, further comprising a seat belt detecting means for detecting the engagement of a seat belt, and a warning generating means, the control means controlling the driving condition of the warning generating means and driving means in accordance with a presence signal to be inputted from the presence deciding means and a seat belt engagement signal to be inputted from the seat belt detecting means.

4. The safety control apparatus as defined in claim 1, where the vibration sensor is composed of a piezo-electric material, an electrode provided on both the faces of the piezo-electric material, a connecting terminal portion being connected with the electrode so as to guide the output signal of the electrode.

5. The safety control apparatus as defined in claim 4, where the vibration sensor has an impedance conversion portion connected adjacently to a connecting terminal portion.

6. The safety control apparatus as defined in claim 5, where the vibration sensor has a shielded portion on its outer block.

7. The safety control apparatus as defined in claim 4 where the vibration sensor has a shielded portion on its outer block.

8. The safety control apparatus as defined in claim 1, where the vibration sensor is provided with a piezo-electric material, an electrode provided on both the faces of the piezo-electric material, a connecting terminal portion being connected with the electrode so as to guide the output signal of the electrode and a first resistor connected between the electrodes, and further comprising a second resistor connected with one of the electrode, an abnormality detecting means for detecting the abnormality of the vibration sensor in accordance with the voltage value divided with the first resistor and the second resistor.

9. The safety control apparatus as defined in claim 1, where the vibration sensor has a piezo-electric material, an electrode provided on both the faces of the piezo-electric material, a connecting terminal portion provided on both ends of the electrodes, and further comprising an abnormality detecting means for judging the abnormality of the vibration sensor by the detection of the resistance value between the connecting terminal portions.

10. The safety control apparatus as defined in claim 1, further comprising a vibration applying means for applying the vibrations upon a vibration sensor, an abnormality detecting means for detecting the abnormality of the vibration sensor in accordance with the output signal from the physical movement characteristic detecting means at this time when the vibrations are applied by the vibration applying means.

11. The safety control apparatus as defined in claim 1, further comprising a reference signal input means for inputting the predetermined reference signal to the physical movement characteristic detecting means, an abnormality detecting means for detecting the abnormality of the physical movement characteristic detecting means in accordance with the output signal of the physical movement characteristic detecting means at the time when the reference signal has been inputted.

12. The safety control apparatus as defined in claim 1, where the physical movement characteristic detecting means is composed of a filter for filtering only a specific frequency component among the output signals of the vibration sensor, an amplifier portion for amplifying the output signal of the filter, a smoothing portion for smoothing the output signals of the amplifying portion.

13. The safety control apparatus as defined in claim 1, where the presence deciding means is provided with a timer to be operated if the physical movement signal to be inputted from the physical movement characteristic detecting means is a predetermined set value or more, and a deciding portion which judges the presence if a clocking signal to be inputted from the timer is a certain constant time or more, and judges the absence if it is not the time.

14. The safety control apparatus as defined in claim 1, where the presence deciding means is composed of a first deciding portion for judging that a sitter is present if the physical movement signal to be inputted from the physical movement characteristic detecting means is a predetermined first set value or more and judging that a sitter is absent if it is not the time, and a second deciding portion retains the decision of the absence before the physical movement signal becomes the predetermined second set value or more if the absence judgment is effected by the first deciding portion and judges whether or not a sitter is present in accordance with the first deciding portion when the physical movement signal becomes the second set value or more.

15. The safety control apparatus as defined in claim 1, further comprising a running speed detecting means for detecting the running speed of a moving vehicle, the presence deciding means being composed of a calculating portion for calculating a set value for the presence judgment in accordance with the running speed signal to be inputted from the running speed detecting means, and a deciding portion for comparing the physical movement signal to be inputted from the physical movement characteristic detecting means with the set value so as to decide that a sitter is present.

16. The safety control apparatus as defined in claim 1, where the physical movement characteristic detecting means is provided with a plurality of filters for filtering a specific frequency component of the respective output signals of the vibration sensor, and the presence deciding means judges whether or not a sitter is present in accordance with a plurality of output signals of the plurality of filters.

17. The safety control apparatus as defined in claim 1, further comprising a physiological mental state deciding means for judging the physiological mental state such as arousal level, tension degree or the like of the present sitter in accordance with the physical movement to be inputted from the physical movement characteristic detecting means, the control means having a timer to be operated if the physiological mental state deciding signal to be inputted from the physiological mental state deciding means is beyond a predetermined set value, with a presence signal being inputted from the presence deciding means, a driving control portion for stopping the driving operation of the driving means if the clocking signal of the timer is a predetermined set time or more, and a warning generating means for generating the warning by the operation of the timer.

18. The safety control apparatus as defined in claim 17, where the physiological mental state deciding means is provided with a timer to be operated if a physical movement signal to be inputted from the physical movement characteristic detecting means is a predetermined set value or more, an arousal level deciding portion for deciding an arousal level of a person present in the accordance with the clocking signal to be inputted from the timer.

19. The safety control apparatus as defined in claim 18, where the physiological mental state deciding means is provided with a heart pulse detecting portion for detecting the heart pulses of a person present in accordance with the physical movement signal to be inputted from the physical movement characteristic detecting means, and an arousal level deciding portion for judging an arousal level in accordance with the heart pulse signal to be inputted from the heart pulse detecting portion.

20. The safety control apparatus as defined in claim 18, where the physiological mental state deciding means is provided with a computing portion for effecting the frequency analysis of the physical movement signals to be inputted from the physical movement characteristic detecting means, and a tension degree deciding portion for judging the mental and physical tension degree of a person present in accordance with the frequency analysis signal to be inputted from the calculating portion.

* * * * *

UNITED STATES PATENT AND TRADEMARK OFFICE
CERTIFICATE OF CORRECTION

PATENT NO. : 5,404,128
DATED : April 4, 1995
INVENTOR(S) : Hiroyuki OGINO et al.

It is certified that error appears in the above-indentified patent and that said Letters Patent is hereby corrected as shown below:

Title page, at [73] Assignee add --Honda Giken Kogyo Kabushiki Kaisha, Tokyo, Japan--

Signed and Sealed this

First Day of August, 1995

Attest:

BRUCE LEHMAN

*Attesting Officer*  *Commissioner of Patents and Trademarks*